United States Patent
Matsuzaki et al.

(10) Patent No.: US 6,804,683 B1
(45) Date of Patent: Oct. 12, 2004

(54) SIMILAR IMAGE RETRIEVING APPARATUS, THREE-DIMENSIONAL IMAGE DATABASE APPARATUS AND METHOD FOR CONSTRUCTING THREE-DIMENSIONAL IMAGE DATABASE

(75) Inventors: Hiroshi Matsuzaki, Hachioji (JP); Akio Kosaka, Hachioji (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 572 days.

(21) Appl. No.: 09/716,692

(22) Filed: Nov. 20, 2000

(30) Foreign Application Priority Data

Nov. 25, 1999 (JP) .......................... 11-334295
Nov. 26, 1999 (JP) .......................... 11-336286

(51) Int. Cl.$^7$ ............................. G06F 17/30
(52) U.S. Cl. .................... 707/104.1; 345/418; 345/419; 382/190; 707/1
(58) Field of Search ................. 707/1, 3, 100, 707/6, 7, 103 R, 104.1; 382/173, 174, 190, 189, 164, 165, 180; 345/419, 418

(56) References Cited

U.S. PATENT DOCUMENTS

| | | | | |
|---|---|---|---|---|
| 5,305,429 A | * | 4/1994 | Sato et al. | 345/419 |
| 5,381,526 A | * | 1/1995 | Ellson | 345/530 |
| 5,754,676 A | * | 5/1998 | Komiya et al. | 382/132 |
| 5,818,959 A | * | 10/1998 | Webb et al. | 382/154 |
| 5,949,409 A | * | 9/1999 | Tanaka et al. | 345/549 |
| 6,012,069 A | * | 1/2000 | Shibazaki | 707/104.1 |
| 6,035,055 A | * | 3/2000 | Wang et al. | 382/118 |
| 6,084,589 A | * | 7/2000 | Shima | 345/419 |
| 6,084,978 A | * | 7/2000 | Taylor et al. | 382/154 |
| 6,249,607 B1 | * | 6/2001 | Murakawa | 382/199 |
| 6,549,607 B1 | * | 4/2003 | Webber | 378/8 |

FOREIGN PATENT DOCUMENTS

| | | |
|---|---|---|
| JP | 5-159001 | 6/1993 |
| JP | 6-215105 | 8/1994 |

OTHER PUBLICATIONS

Shyu, C.R., et al., "Local versus Global Features for Content-Based Image Retrieval", Proceedings of IEEE Workshop on Content-Based Access of Image and Video Libraries, pp. 30–34, Jun. 1998.

Mehrotra, R., et al., "Shape–Similarity–Based Retrieval in Image Databases", Chapter 3 of Image Description and Retrieval, Plenum Press, New York, 1998, pp. 55–86.

Gao, J., et al., "Color Image Segmentation Editor Based on the Integration of Edge–Linking, Region Labeling and Deformable Model", Proceeding of IEEE International Conference on Systems, Man and Cybernetics, Tokyo, Oct. 1999.

(List continued on next page.)

Primary Examiner—Greta Robinson
Assistant Examiner—Cheryl Lewis
(74) Attorney, Agent, or Firm—Scully, Scott, Murphy & Presser

(57) ABSTRACT

A similar image retrieving means has a region of interest setting portion, a feature quantity calculation portion, a similarity calculation portion and an image selection portion. A part of the three-dimensional image of the retrieval object is set as a region of interest. The feature quantity calculation portion calculates the quantity of the region of interest. The similarity calculation portion calculates the similarity between the retrieval object and the three-dimensional image data stored in advance by comparing the feature quantity of the region of interest of the retrieval object which quantity is calculated with the feature quantity calculation means with the three-dimensional image data where the region of interest is set which is stored in advance in the image database, and the feature quantity of this region of interest is calculated. The image selection portion selects similar images in an order of decreasing similarity from the image database.

18 Claims, 15 Drawing Sheets

OTHER PUBLICATIONS

Dy, J.G., et al., "The Customized–Queries Approach to CBIR Using EM", Proceedings of IEEE International Conference on Computer Vision and Pattern Recognition, vol. II, Jun. 1999.

Horn, B.K.P., et al., "Closed–form solution of absolute orientation using unit quaternions", Journal of Optical Society of America A, vol. 4, No. 4, pp. 629–642, 1987.

* cited by examiner

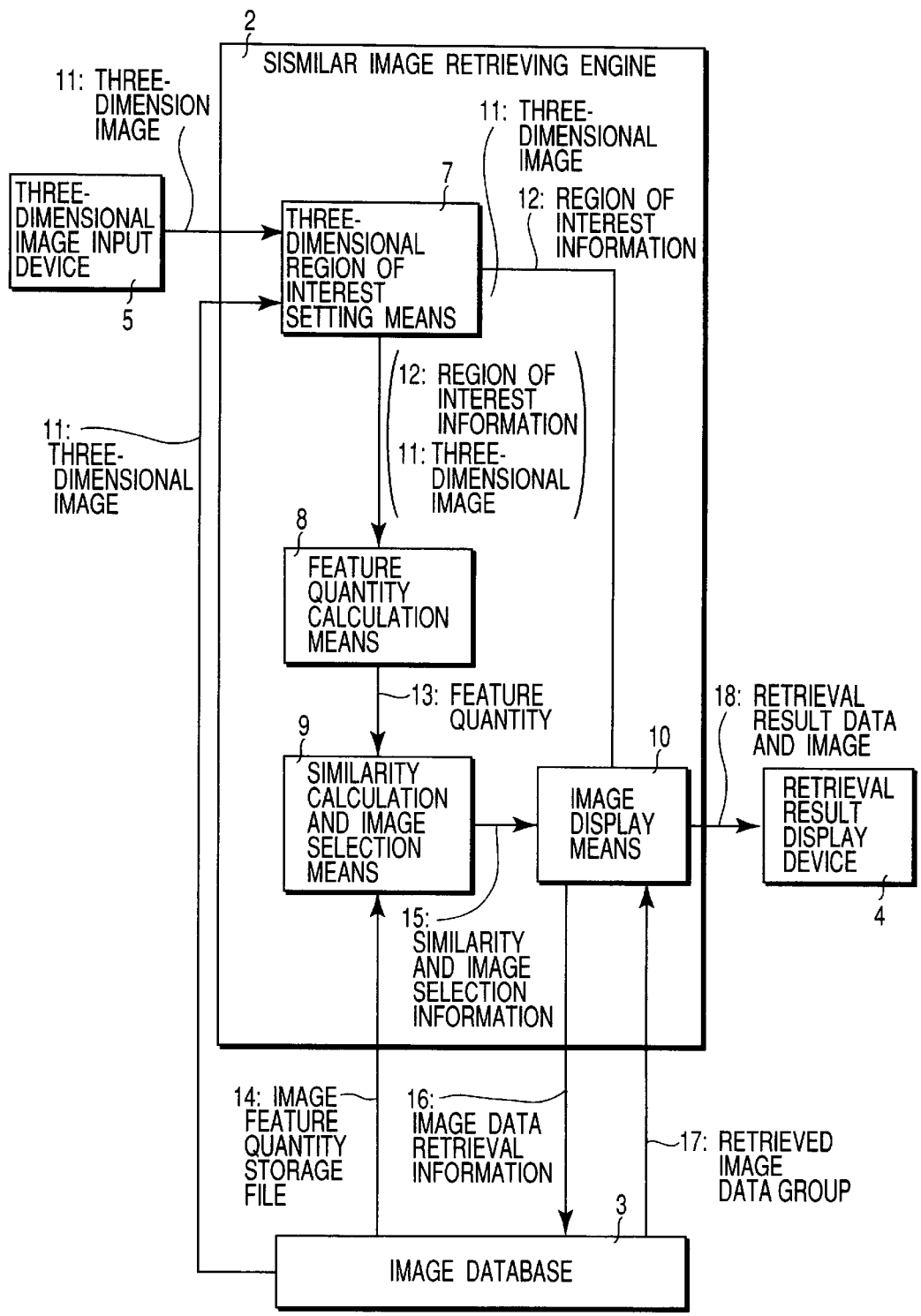
F I G. 2

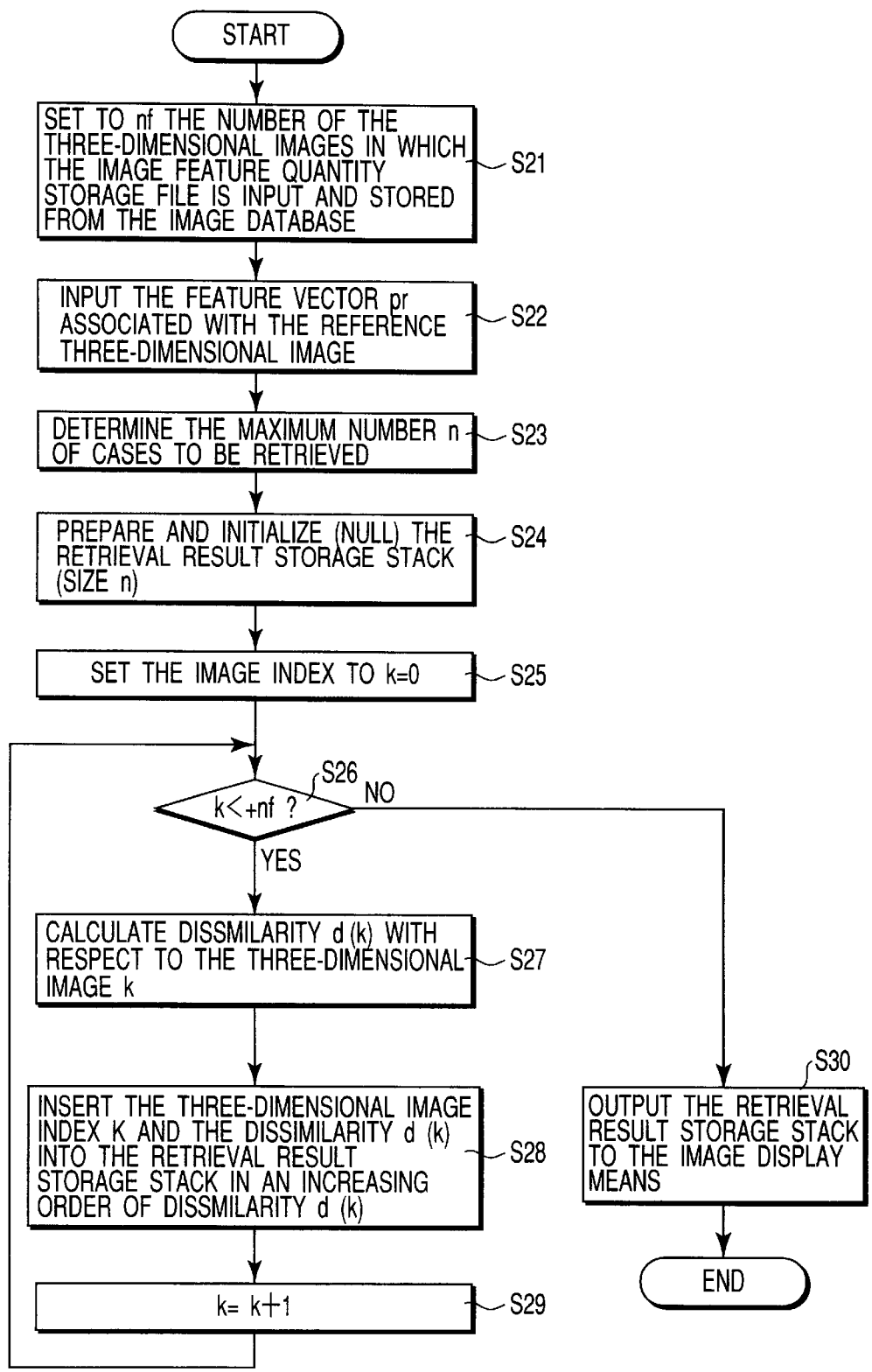
F I G. 11

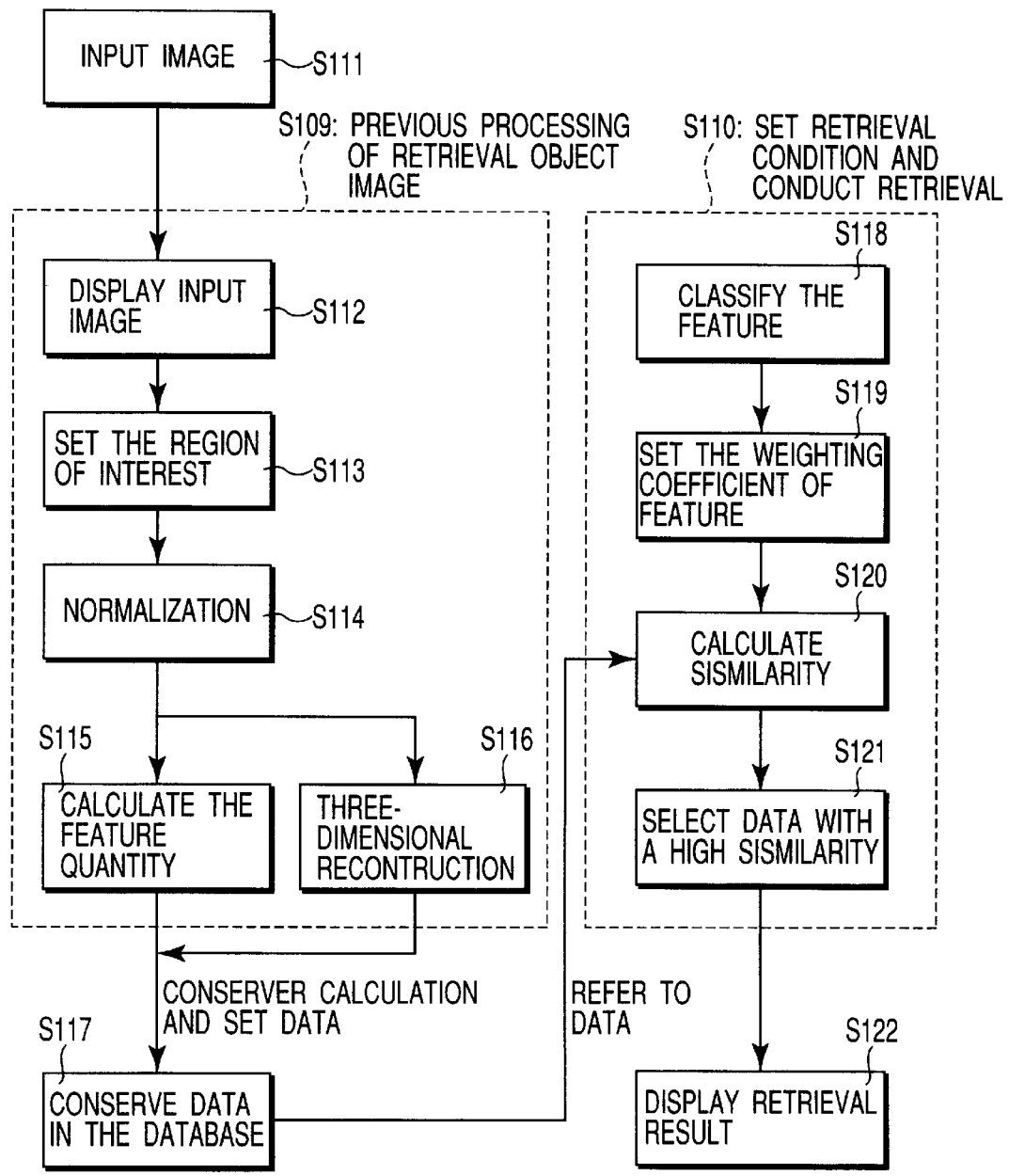
F I G. 16

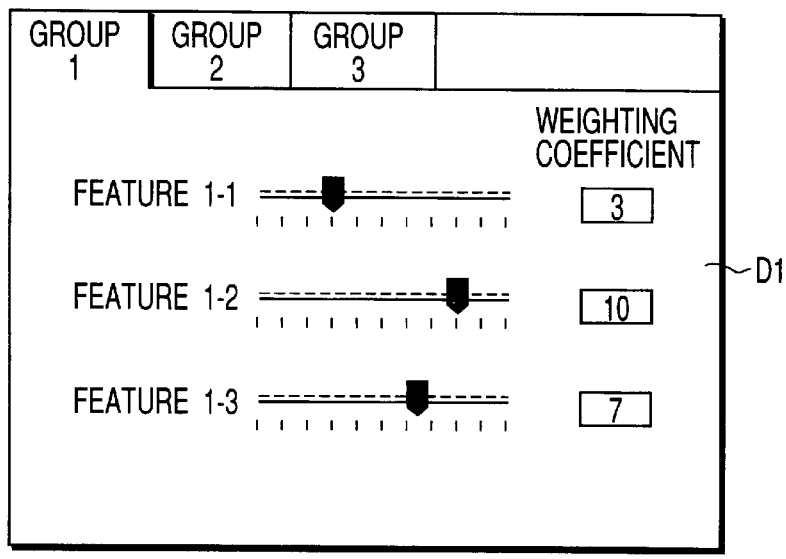
F I G. 18
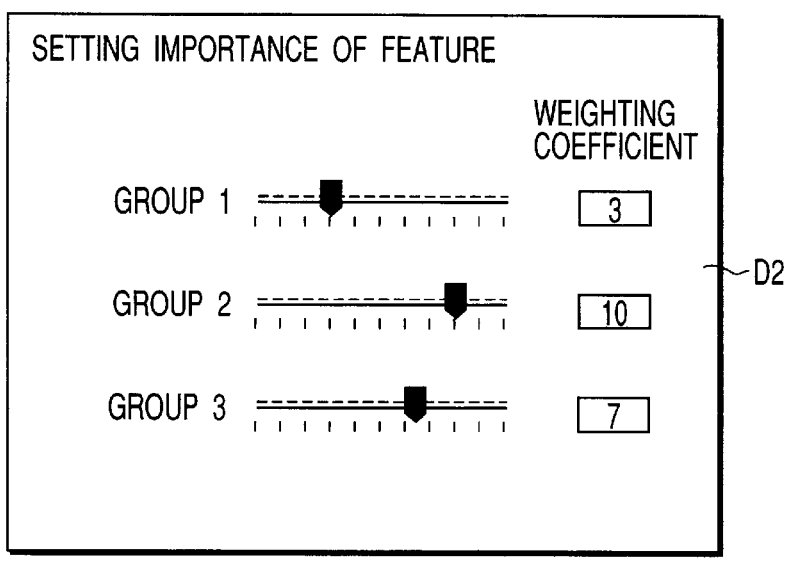
F I G. 19

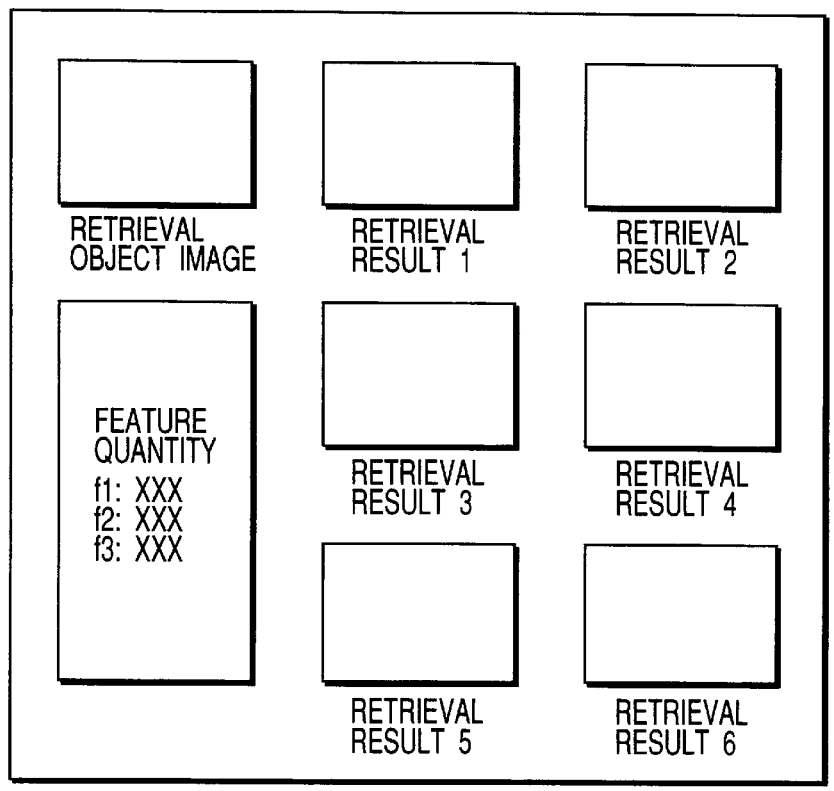
F I G. 20
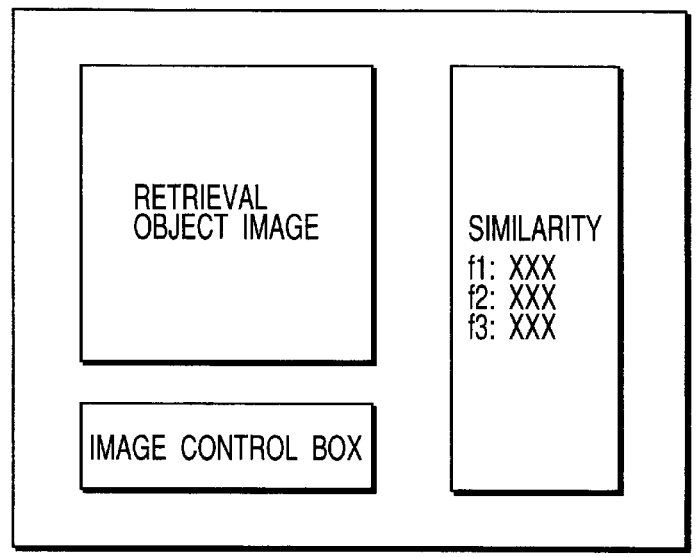
F I G. 21

SIMILAR IMAGE RETRIEVING APPARATUS, THREE-DIMENSIONAL IMAGE DATABASE APPARATUS AND METHOD FOR CONSTRUCTING THREE-DIMENSIONAL IMAGE DATABASE

CROSS-REFERENCE TO RELATED APPLICATIONS

This application is based upon and claims the benefit of priority from the prior Japanese Patent Applications No. 11-334295, filed Nov. 25, 1999; and No. 11-336286, filed Nov. 26, 1999, the entire contents of which are incorporated herein by reference.

BACKGROUND OF THE INVENTION

The present invention relates to similar image retrieving apparatuses, and more particularly to a similar image retrieving apparatus for retrieving similar images from image database with respect to three-dimensional medical use images such as an MRI, a CT or the like, and complicated three-dimensional shape image data or three-dimensional CAD data or the like which can be obtained from the three-dimensional measuring device or the like.

Furthermore, the present invention relates to three-dimensional database apparatuses and a methods for constructing three-dimensional image database, and more particularly to a method and an apparatus for extracting region of interest and calculating a feature quantity from the three-dimensional image, thereby constructing database for retrieving similar images on the basis of these data items.

Method in Literature 1

Conventional examples of a system for retrieving similar case images associated with similarity of lesion portions with respect to medical images such as lungs include a method described in Literature 1: "Local Versus Global Features for Content-Based Image Retrieval" by C. R. Shyu, C. E. Brodley, A. C. Kak, A. Kosaka, A. Aisen and L. Broderick, in pages 30–34 of the Proceedings of IEEE Workshop on Content-Based Access of Image and Video Libraries, Santa Barbara, Calif., Jun. 1998.

In this method of literature 1, the region of interest desired by a doctor is set by the masking of the lesion portion localized within the CT image of the lung by the doctor who is the user of the method, so that the case images similar to the masked region are retrieved from the medical use image database.

There is available an advantage in that more appropriate retrieval is enabled with the method of literature 1 as compared with conventional methods in order to accurately extract the lesion portion intended by the doctor who is the user of the method.

Method of Literature 2

Similar image retrieving systems corresponding to three-dimensional models include a system described in literature 2:"Shape-Similarity-Based Retrieval in Image Databases by R. Mehrotra and J. Gary, in pages 55–86 of Chapter 3 of Image Description and Retrieval, edited by E. Vicario, Plenum Press, New York, 1998.

The method of literature 2 in this paper is a method for calculating a similarity of polygons by registering a three-dimensional model of the object as a CAD model of a linear image and using a position relationships of the linear image.

The method has an advantage in that a three-dimensional object can be retrieved which can be represented in the CAD or the like.

In the method proposed in literature 1 described above, the image to be used by the doctor is basically a two-dimensional image. The masking of the lesion portion is merely two-dimensional image as well.

However, the lesion portion treated in the inspection image such as the CT, the MRI or the like is distributed in a three-dimensional manner. It is difficult to accurately describe the three-dimensional distribution and the three-dimensional position of the lesion portion in an accurate manner.

For example, in the CT and the MRI images in the brain surgery, it is thought that the three-dimensional distribution of the lesion portion and the position thereof have a significant meaning. There is a disadvantage in that it is difficult to accurately retrieve the case images only with the method of literature 1.

Furthermore, in the method proposed in literature 2 described in literature 2, the three-dimensional object is limited to an object that can be described in a simple polygon model. The object is described with the end points and line portions of such polygons, and only the position relations thereof are used. The method does not include the modeling of the texture peculiar to the three-dimensional object and the modeling of the position relationships of the three-dimensional objects.

Furthermore, conventionally as a system for retrieving images, a system using a two-dimensional image data is generally used.

These systems extract features from two-dimensional image data, accumulate the features quantities in the database and retrieve the images on the basis of these features quantities.

Furthermore, in recent years, along with the prevalence of the three-dimensional image, only regions in which users take interest are extracted from the three-dimensional data and the regions are transformed into three-dimensional object to be displayed on a display device with the result that each kind of inspection is conducted more and more frequently in recent years.

However, this three-dimensional image data is extremely large in quantity, and the usage thereof is extremely complicated.

At the time of accumulating the large quantity of this three-dimensional image data in the database, it is necessary to efficiently construct the database itself in the form in which the database itself can be retrieved with ease later in order to enable the user to efficiently retrieve the image data demanded by the user out of this image data.

In order to attain such purpose, Jpn. Pat. Appln. KOKAI Publication No. 5-159001 discloses an apparatus for retrieving three-dimensional figures.

This apparatus is such that two-dimensional information such as front views, sectional views, bird's eye views or the like which represents well the feature of the figures is accumulated in the database with an addition of retrieval keys to the figures, so that upon the figure desired by the user being retrieved, information on the corresponding three-dimensional figure is detected while subsequently displaying the associated two-dimensional information on the screen.

Furthermore, in a three-dimensional image processing apparatus according to Jpn. Pat. Appln. KOKAI Publication No. 6-215105, there is disclosed an example in which three-dimensional geometric shape information and attribute information of an object is stored, and images are retrieved on the basis of this three-dimensional geometric shape information and the attribute information with the result that the two-dimensional projection images are displayed with the three-dimensional geometric shape information and the attribute information given as a result of image retrieval.

However, the two-dimensional image retrieving system as the prior art described above has a problem in that the feature used in the retrieval of the images is obtained from the two-dimensional image data, and the feature quantity inevitably accumulated in the database becomes two-dimensional, and the feature-of the images having three-dimensional-like information cannot be represented, so that the system cannot be used as means for retrieving three-dimensional-like similar image data.

Furthermore, in a system for retrieving three-dimensional figures disclosed in Jpn. Pat. Appln. KOKAI Publication No. 5-159001 described as the prior art described above, so-called structure data such as CAD data or the like is primarily retrieved, and only wire-frame-like information can be accumulated in the database with respect to such structure data.

However, general three-dimensional images have not only such structure data but also complicated data such as information on the pixel contrast, texture information or the like.

Consequently, there is a problem in that the apparatus for retrieving three-dimensional figures disclosed in Jpn. Pat. Appln. KOKAI Publication No. 5-159001 cannot retrieve the figures in consideration of the fine shape changes on the surface which can be assumed from the features of complicated information inherent in general three-dimensional images and in consideration of similarity on the inside information of objects.

Furthermore, this apparatus provides only a plurality of displays of two-dimensional information with respect to the display of the result of retrieval. However, in order to display three-dimensional images on the display device, it is difficult to accurately transmit the image information to users unless the display is provided from an arbitrary viewpoint. From this viewpoint, there arises a problem in that detailed three-dimensional information cannot be displayed visually.

In the same manner, in the so-called three-dimensional image processing apparatus disclosed in Jpn. Pat. Appln. KOKAI Publication No. 6-215105 as well, the input information is only the position of the tips of polygon patches, the connection information of the tips, and the material characteristic, and texture features inherent in objects are not taken into consideration.

BRIEF SUMMARY OF THE INVENTION

An object of the present invention is to provide an similar image retrieving apparatus which can be used in three-dimensional medical use images such as MRI's and CT's, complicated three-dimensional shape image data or three-dimensional CAD data which can be obtained from a three-dimensional measuring device, or three-dimensional CAD data, the apparatus treating three-dimensional images and objects in consideration of the region of interest and the intention of the user and enabling more accurate retrieval thereof.

Furthermore, another object of the present invention is to provide three-dimensional image database apparatus and a method for constructing three-dimensional image database wherein effective retrieval of three-dimensional images is enabled by using peculiar features inherent in three-dimensional images in order to retrieve the three-dimensional images.

In order to accomplish the above object, the present invention provides a similar image retrieving apparatus comprising:

a region of interest setting portion for setting a portion of a three-dimensional image of retrieved object as a region of interest;

a feature quantity calculation portion for calculating a feature quantity of the region of interest set by the region of interest setting portion;

a similarity calculation portion for calculating a similarity between the retrieved object and three-dimensional image data stored in the image database in advance by comparing the feature quantity of the region of interest of the retrieved object which quantity is calculated with the feature quantity calculation portion with the three-dimensional image data where a region of interest stored in the image database is set in advance and the feature quantity of this region of interest is calculated; and an image selection portion for selecting similar images in an order of decreasing similarity from the image database on the basis of the similarity calculated with the similarity calculation portion.

The above similarity calculation portion is characterized by calculating the similarity of the image with respect to only the image with which a key word agrees out of the key words selected from a set of key words prepared in advance and images to which key words are added in advance which images are stored in the image database.

Furthermore, the feature quantity calculation portion is characterized by calculating the feature quantity by setting in advance the three-dimensional standard model which is compared in the image retrieval and using a position posture relationships between the standard model and the retrieved object image data.

Furthermore, in order to accomplish the object, the present invention provides a three-dimensional image database apparatus for retrieving an image similar to an input three-dimensional image, the apparatus comprising:

an image input portion for inputting three-dimensional image data;

a region of interest setting portion for setting a region of interest on the basis of the designated condition with respect to the three-dimensional image data input with the image input portion;

a three-dimensional reconstruction portion for reconstructing three-dimensional image data by normalizing and visualizing this region of interest of the three-dimensional image data set with the region of interest setting portion; and a three-dimensional data accumulation portion for accumulating the three-dimensional image data reconstructed with the three-dimensional reconstruction portion in correspondence to the three-dimensional image data input with the image input portion.

The above three-dimensional image database apparatus has a features calculation portion for calculating feature quantity of the image data with respect to the region of interest of the three-dimensional image data set by the region of interest setting means;

wherein the three-dimensional image data accumulation portion accumulates the feature quantity of the image data calculated with the feature quantity calculation portion in correspondence to the three-dimensional image data input with the image input portion.

Furthermore, in order to accomplish the above object, the present invention provides a method for constructing image database for retrieving image data similar to the input three-dimensional image data, the method comprising the steps of:

inputting three-dimensional image data;

setting a region of interest on the basis of the designated condition with respect to the input three-dimensional image data;

reconstructing the three-dimensional image data by normalizing and visualizing the region of interest of the set three-dimensional data; and accumulating the reconstructed three-dimensional image data by allowing the image data correspond to the input three-dimensional image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing an example of a module structure of a similar image retrieving engine 2 of FIG. 1;

FIG. 11 is a flowchart representing each step of the processing procedure in order to explain the processing procedure of the similarity calculation and image selection means 9 of FIG. 2;

FIG. 16 is a flowchart showing in detail a flow from the image input by the fourth embodiment up to the display of the result of the retrieval of similar images;

FIG. 18 is a view showing a dialog box D1 for setting a weighting coefficient with respect to each feature according to the fourth embodiment of the present invention;

FIG. 19 is a view showing a dialog box D2 for setting a weighting coefficient associated with respect to each group according to the fourth embodiment of the present invention;

FIG. 20 is a view showing a display example of the retrieval result according to the fourth embodiment;

FIG. 21 is a view showing a display example which enables reading independently the slice image having the designated slice number with a slider and a designation device by providing an image operation control portion within each of the slice image display window according to the fourth embodiment;

DETAILED DESCRIPTION OF THE INVENTION

Figure 1:
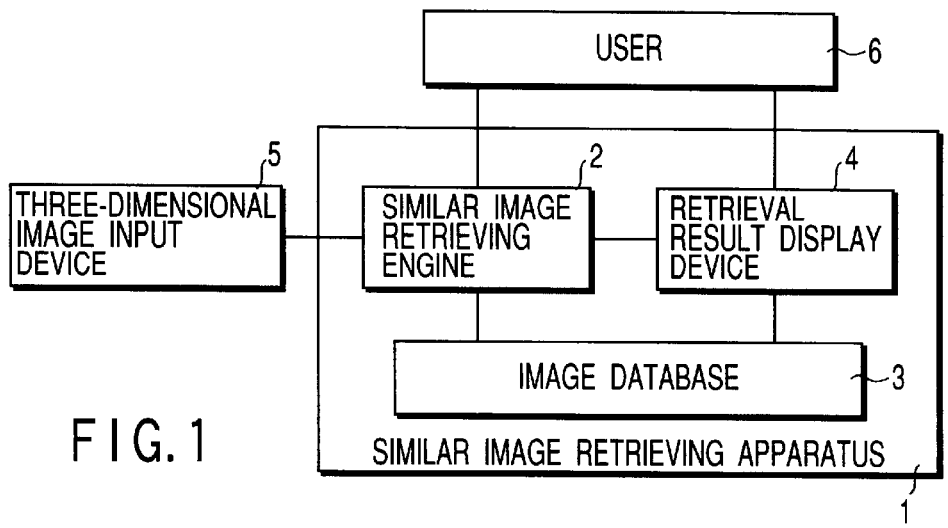
FIG. 1 is a block diagram for explaining a structure of a similar image retrieving apparatus according to a first embodiment of the present invention.

Reference will now be made be made in detail to the presently preferred embodiments of the invention as illustrated in the accompanied drawings, in which like reference numerals designate like or corresponding parts.

First, an embodiment of a similar image retrieving apparatus according to the present invention will be explained.
<First Embodiment>

FIG. 1 is a block diagram for explaining a structure of a similar image retrieving apparatus according to a first embodiment of the present invention.

In FIG. 1, the similar image retrieving apparatus according to the present invention is used in a three-dimensional image input apparatus 5 for inputting a three-dimensional image, and for communication with the user 6 who desires the retrieval of images.

Then, the similar image retrieving apparatus 1 comprises a similar image retrieving engine 2, image database 3 and a retrieval result display device 4.

Here, the similar image retrieving engine 2 is constituted in such a manner that the engine 2 receives the reference image (query) in which the user 6 takes interest from the three-dimensional image input device 5 or the image database 3, analyzes the reference image including an interaction with the user 6, and, at the same time, retrieves similar image groups from the image database 3 on the basis of the analysis result with the result that the retrieved image groups are displayed on the retrieval result display device 4.

FIG. 2 is a block diagram representing the first embodiment including one example of a module structure of the similar image retrieving engine 2.

That is, the similar image retrieving engine 2 comprises three-dimensional region of interest setting means 7 for cutting out the three-dimensional region of interest from the three-dimensional images where the object input from the three-dimensional input device 5 or from the image database 3 is photographed, feature quantity calculation means 8 for calculating the feature quantity of the three-dimensional region of interest set with the three-dimensional region of interest setting means 7, similarity calculation and image selection means 9 for calculating similarity between the three-dimensional region of interest and a constituent element of a three-dimensional image group stored in advance in the image database 3, a three-dimensional region of interest being set and the feature quantity being calculated by using the feature quantity thereof and selecting similar images from the image database 3 in an order of decreasing similarity on the basis of the similarity, and an image display means 10 for retrieving the three-dimensional image selected with the similarity calculation and image selection means 9 from the image database 3 and displaying the image.

The three-dimensional region of interest setting means 7 receives the three-dimensional image 11 of the reference image given by the three-dimensional input device 5 or the image database 3, and generates the region of interest information 12 which the user 6 desires including the interaction with the user 6.

The region of interest 12 and the three-dimensional image 11 generated in this manner are sent to the feature quantity calculation means 8.

This feature quantity calculation means 8 calculates the three-dimensional image feature quantity within the region of interest (or both in and out of the region of interest) set by the three-dimensional region of interest setting means 7.

The feature quantity 13 with respect to the reference image calculated in this manner is sent to the similarity calculation and image selection means 9.

This similarity calculation and image selection means 9 reads the image feature quantity storage file 14 where the image feature quantity is stored with respect to the three-dimensional image or an object in the image database stored in the image database 3 in advance, and calculates a similarity between the feature quantity 13 with respect to the reference image and the feature quantity 13 with respect to each of the three-dimensional images stored in the image feature quantity storage file 14 so that a predetermined order is added to the image having a great similarity.

Information concerning images ordered in this manner is sent out to the image display means 10 as the similarity image selection information 15.

This image display means 10 obtains the similar image group from the image database 3 on the basis of the image data retrieval information 16 as retrieved image data group 17, and displays the retrieval result data and the image 18 on the retrieval result display means 4.

Hereinafter, an example of the first embodiment will be explained by citing an example of the image retrieval with respect to the medical use images such as CT's and MRI's.

In the beginning, in the MRI and CT inspection images used in the brain surgery and radiologic department, three-dimensional images are generally generated by photographing in order a plurality of slice images.

Consequently, the three-dimensional region constituted by the lesion portion or the like can also be constituted by providing Boxel's expression with the integration of a plurality of these slice images.

Here, an example of an MRI image in the brain surgery will be explained.

In the case of this MRI image, photographing inspection images along the body axis of the subject is general. For example, when the axis is defined as Z-axis, it is thought that each slice image constitutes the X-plane and the Y-plane.

Then, when the slice pitch in the direction of Z-axis is denoted by dz (mm/slice), the horizontal direction of the slice image is defined as X-axis, the image pixel resolution in the direction of X is denoted by dx (mm/pixel), and the vertical direction of the slice image is defined as Y-axis and the image pixel resolution in the direction of Y-axis is denoted by dy (mm/pixel), the inspection image photography start position is defined as, for example, the original point, X-axis, Y-axis, and Z-axis are defined, the three-dimensional position in the Boxel's inspection image corresponding to the indices (i, j, k) in the direction of X-axis, Y-axis, and Z-axis of the inspection image can define the position coordinates of q (idx, jdy, kdz).

In this manner, the inspection image coordinates system regulated in the inspection image and the coordinates values in the coordinates system can be defined.

Furthermore, the contrast values of the Boxel are added to each Boxel of the three-dimensional image which is defined in this manner.

This contrast value has, for example, 16 bits or 8 bits density level.

Hereinafter, it is presupposed that the three-dimensional image photographed by the three-dimensional input device 5 is given to the similar image retrieving engine 2 in the format described above.

Next, each of the modules in the similar image retrieving engine 2 will be explained in detail.

(1) Three-dimensional Region of Interest Setting Means 7

This three-dimensional Region of interest setting means 7 is a means for conducting the work for cutting out a region useful for calculating similarity from the three-dimensional image obtained the three-dimensional image input device 5 or the image database 3, under the instruction of the user 6 and for setting the land mark.

Specifically, the work for cutting out the region of interest as described hereinbelow in the beginning.

1) First Method (Method for setting the threshold value and setting the region of interest by the noise removal)

FIG. 3 and FIGS. 4A through 4D are views for explaining an outline of the first method (a method for setting the threshold value and setting the region of interest by the noise removal).

Figure 3:
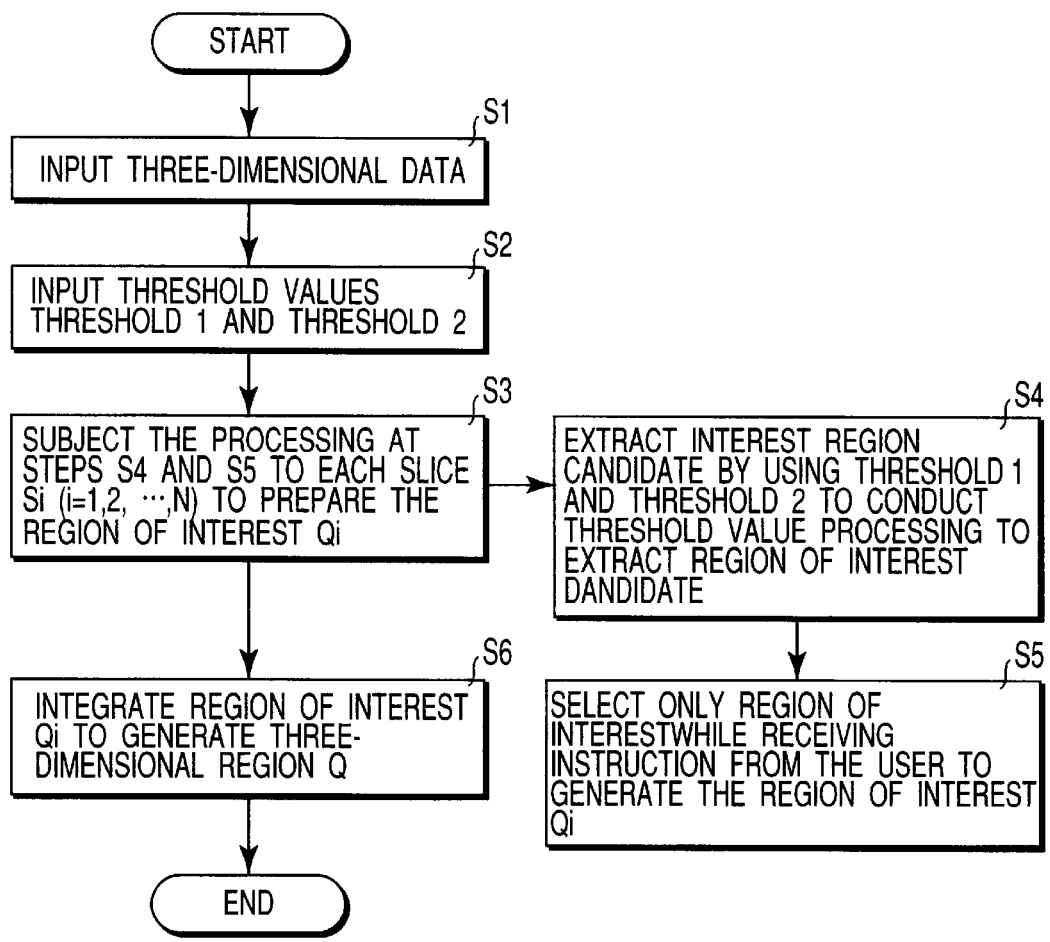
FIG. 3 is a flowchart showing each step of a processing procedure, the flowchart being for explaining an outline of a first method (a method for setting a threshold value and for setting a region of interest by the removal of noises) for work of cutting out the region of interest by means of the three-dimensional region of interest setting means 7 of FIG. 2.

FIG. 3 is a flowchart showing each step of the processing procedure a) In the beginning, at step Si, three-dimensional images stored in advance in the three-dimensional input device 5 or the image database in advance 3 are input as a set of slice images (as described above, each of the slice images is in X-axis and Y-axis, the direction vertical to the slice is defined as Z-axis, the sum total of the slices is denoted by B and each of the slices is denoted as Si (i=1, 2, . . . N).

b) Next, at step S2, the threshold values Threshold 1 and Threshold 2 of the contrast values which are designated by the user 6 in advance are input.

c) Next, at step S3, the following processing is conducted with respect to each of the slice images Si constituting the three-dimensional images.

c-1) In the beginning, at step S4, a region satisfying Threshold 1 <contrast value <Threshold 2 is prepared in the threshold value processing.

c-2) Next, at step S5, with respect to each of the regions, only the region which the user 6 desires is retained, and other regions are removed as noise regions.

The region of interest set on the slice Si in this manner is denoted by Qi.

d) Next, at step S6, the three-dimensional region of interest Q desired by the user 6 is prepared by integrating Qi prepared from each of the slices Si.

FIGS. 4A through 4D is a view showing this state.

Figure 4A:
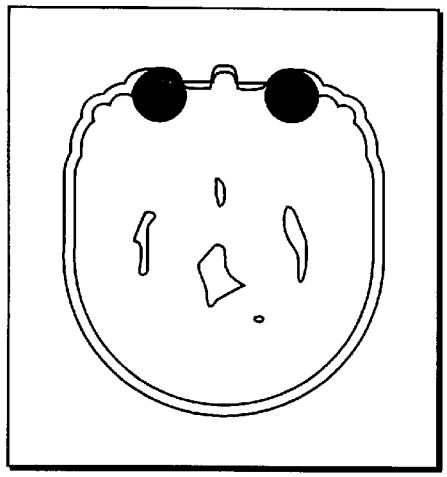
FIGS. 4A through 4D are views showing a state of processing, the view being for explaining an outline of the first method (the method for setting the threshold value and for setting the region of interest by the removal of noises) for work of cutting out the region of interest by means of the three-dimensional region of interest setting means 7 of FIG. 2.

FIG. 4A is a view showing an original image of the slice image Si.

Figure 4B:
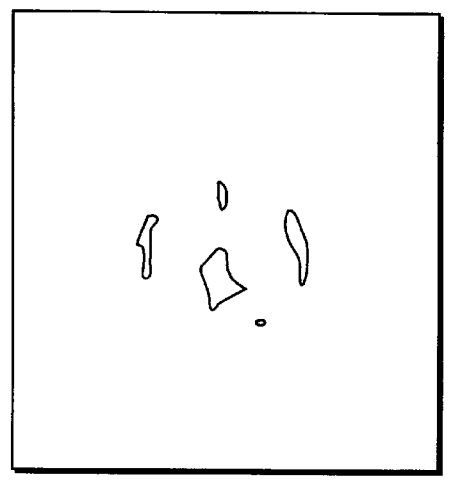

FIG. 4B is a view showing a result of the threshold value processing with respect to the slice image Si. Through this procedure, the threshold value region candidates are extracted.

Figure 4C:
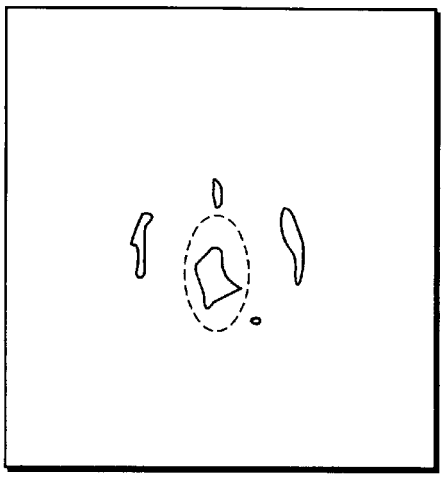
Figure 4D:
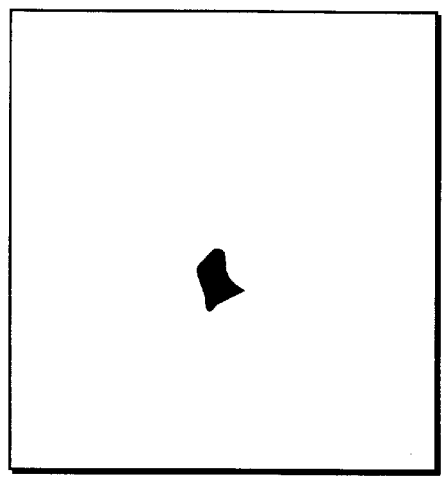

FIG. 4C is a view showing a state in which the real region of interest is selected under the instruction of the user, wherein the work is conducted for cutting out the region of interest portion with the pointing device such as a mouse or the like FIG. 4D is a view showing the region of interest Qi set in this manner.

2) Second Method (Method for Setting the Region of Interest on the basis of the Setting of the Boundary using the pointing device)

FIG. 5 and FIGS. 6A through 6C are views for explaining an outline of a second method (a method for setting the region of interest on the basis of the setting of the boundary using the pointing device).

Figure 5:
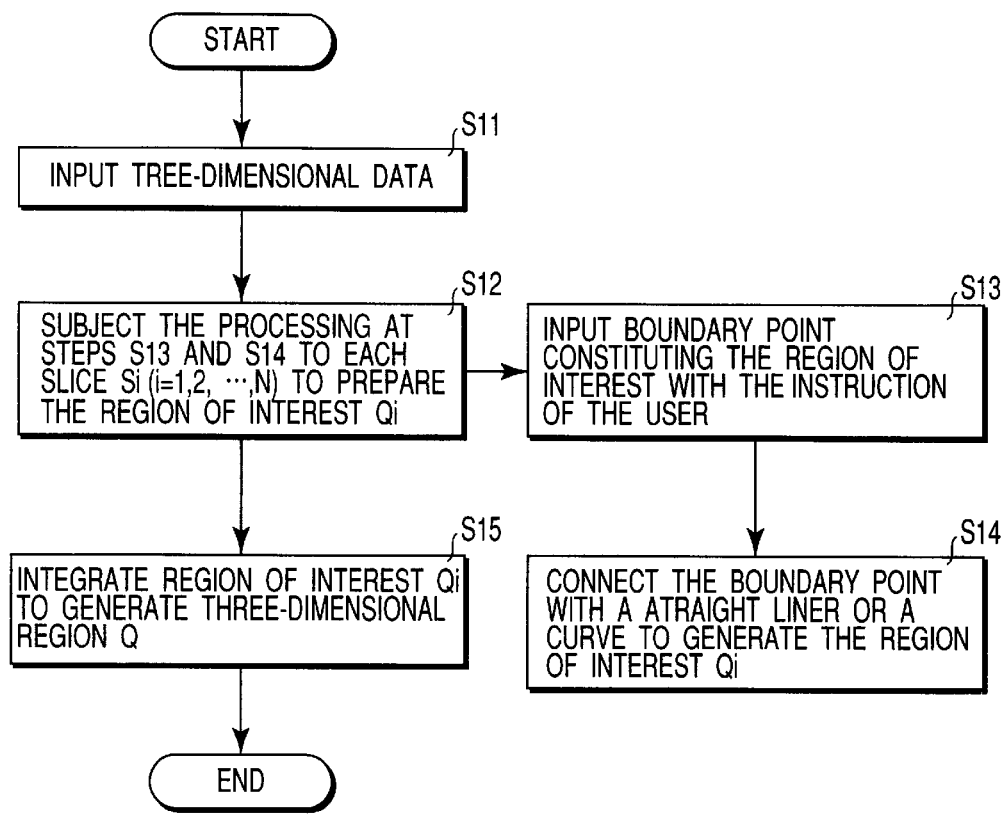
FIG. 5 is a flowchart showing each step of a processing procedure, the flowchart being for explaining an outline of a second method (a method for setting a region of interest on the basis of the setting of the boundary using a pointing device) for work of cutting out a region of interest by means of the three-dimensional region of interest setting means 7 of FIG. 2.

FIG. 5 is a flowchart representing each step in the processing procedure.

a) In the beginning, at step 11, three-dimensional images stored in advance in the three-dimensional input device 5 or the image database in advance 3 are input as a set of slice images (as described above, each of the slice images is in X-axis and Y-axis, the direction vertical to the slice is defined as Z-axis, the sum total of the slices is denoted by N and each of the slices is denoted as Si (i=1, 2, . . . n)).

b) Next, at step S12, the following processing is conducted with respect to the each of the slice images constituting the three-dimensional image.

b-1) In the beginning, at step S13, the user 6 sets the boundary point of the region of interest with the pointing device such as a mouse or the like.

Figure 6A:
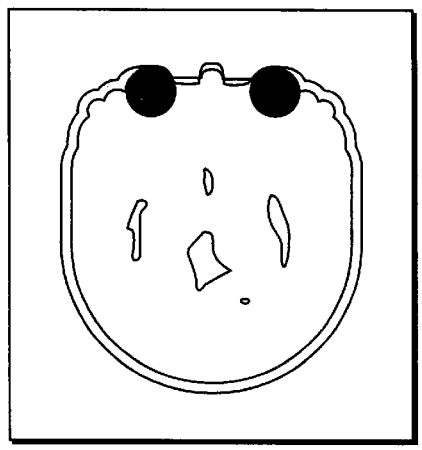
FIGS. 6A through 6C are views showing a state of processing, the view being for explaining an outline of the second method (the method for setting the region of interest on the basis of the setting of the boundary using the pointing device) for work of cutting out the region of interest by means of the three-dimensional region of interest setting means 7 of FIG. 2.
Figure 6B:
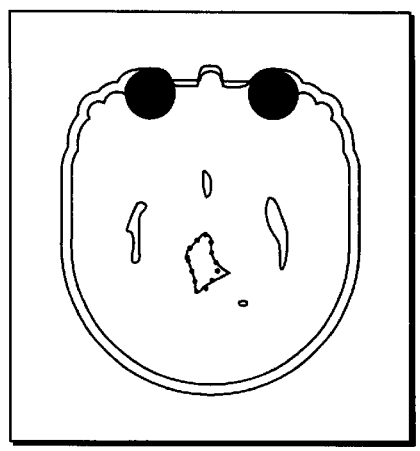

FIG. 6B is a view showing this state. In FIG. 6B, the boundary is represented as a set of points (boundary points) constituting the boundary. The coordinates of the boundary point is determined with the instruction from the mouse by the user 6.

These points are represented as (xi(k), yi(k), zi(k)).

b-2) Next, at step S14, the boundary points (xi(k), yi(k), zi(k)) determined at step S13 are connected with the a straight line or a curve such as a spline or the like, so that the boundary of the two-dimensional region of interest is set. At the same time, the closed region-constituted by the boundary is subsequently set as the region of interest Qi of the slice Si.

Here, at the time of setting the region by the boundary, it is likely that the hole region is set by the user 6 inside thereof.

c) Next, at step S15, the three-dimensional region of interest desired by the user 6 is prepared by connecting all Qi's prepared by each of the slices Si.

Figure 6C:
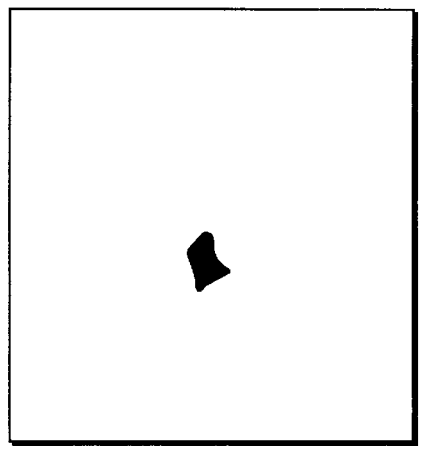

FIGS. 6A through 6C are views showing this state. FIG. 6A is a view showing the original image of the slice image Si.

Furthermore, FIG. 6B is a view showing a state in which the region of interest is set under the instruction from the user 6 with respect to the slice image Si, the view showing a state of the work for cutting out the region of interest portion by the pointing device such as a mouse or the like.

3) Third Method (Method using the Segmentation Editor)

In this third method (a method using the segmentation editor), as described in literature 1 described in the prior art section, the region is set by using the segmentation editor with respect to each of the slice images.

This method is described in detail in literature 3:"Color Image Segmentation Editor Based on the Integration of Edge-Linking, Region Labeling and Deformable Model, " by J. Gao, et al. in the Proceeding of IEEE International Conference on Systems, Man and Cybernetics, Tokyo, October 1999. Thus, the detailed explanation thereof is omitted here.

In this method, the region of interest Qi is determined with respect to each of the slice images Si, and the Qi is integrated thereafter, so that the three-dimensional region of interest Q is generated.

This three-dimensional region of interest Q is defined as the three-dimensional arrangement similar to the three-dimensional image S which is the original image, and the portion set as the region of interest is denoted by 1, and other regions are denoted by 0.

So far, the region of interest corresponding to the lesion portion is set. However, the three-dimensional region of Interest setting means 7 can set the land mark corresponding to the tissue of the subject.

For example, with respect to the slice image of the head, the three-dimensional region of interest setting means 7 sets either automatically or by the position designation by the user a convenient position for ruling out the portion which constitutes a land mark of the head (for example, the central position of the right and left eyeballs, the front teeth position, the brain stem or the like), and the position of the lesion portion in the head.

Now, the position of the land mark obtained in this manner is set to L={Li:i=1, 2, ..., M}

Figure 7A:
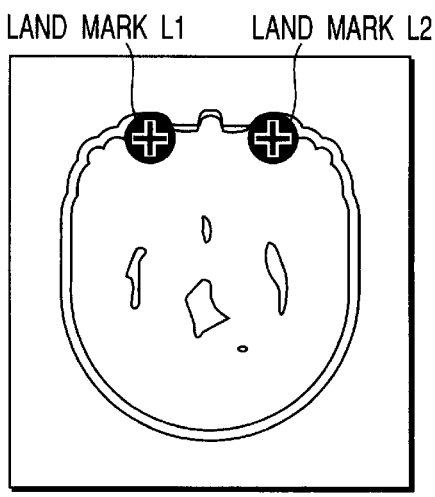
FIGS. 7A and 7B are views showing an outline of land mark setting corresponding to tissues of a subject by the three-dimensional region of interest setting means 7 of FIG. 2.
Figure 7B:
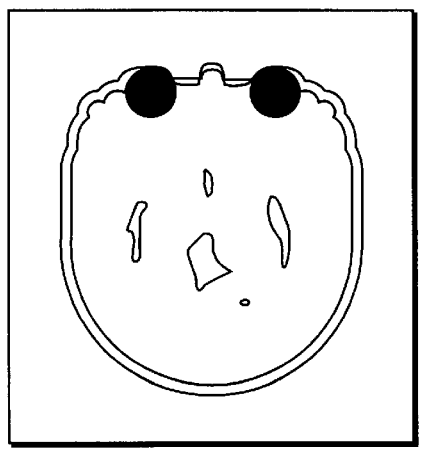

FIGS. 7A and 7B are views showing an outline of the land mark setting.

FIG. 7A is a view showing an original image of the slice image, and FIG. 7B is a view showing the land marks L1 and L2 set by the instruction from the user.

Figure 8:
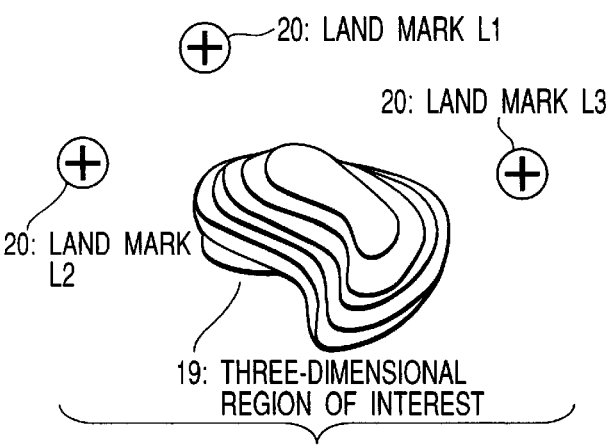
FIG. 8 is a view showing an example in which the three-dimensional region of interest 19 and the land marks L1 (20), L2 (21), and L3 (22) are set in the method shown in FIG. 7.

FIG. 8 is a view showing an example in which the three-dimensional region of interest 19 and the land marks L1(20), L2(21), L3(22) are set in the above method.

As shown in FIG. 8, the three-dimensional region of interest 19 is generated by integrating the two-dimensional region of interest Qi generated from each of the slice images, and the region of interest 19 can be ruled out in the same space as the land marks L1, L2, and L3.

By the three kinds of methods, the region of interest Q={Qi:i=1, 2, ..., N} and the land mark L are set in correspondence to the slice image group S={Si:i=1, 2, ..., N}.

In the three-dimensional region of interest setting means 7 of this module, this slice image group S, the region of interest Q, and the (position of) the land mark L are sent to the other module.

(2) Feature quantity Calculation Means 8

The three-dimensional region of Interest setting means 7 sets the slice image group S, the three-dimensional region of interest Q and the land mark L followed by sending the result to the feature quantity calculation means 8 as the three-dimensional image 11 and the region of interest information 12.

The feature quantity calculation means 8 calculates the image features parameter corresponding to the region of interest Qi as the feature quantity on the basis of the information.

Hereinafter, this method will be explained.

The feature quantity calculated by this feature quantity calculation means 8 can be classified into three kinds.

The feature quantity includes 1) three-dimensional geometric quantity, 2) density feature quantity, and 3) texture feature quantity.

This feature quantity will be explained hereinbelow.

1) The three-dimensional geometric quantity is a parameter which represents the geometric features with respect to the three-dimensional region of interest using the three-dimensional region of interest Q defined by the three-dimensional region of interest setting means, 7 and the geometric features with respect to the three-dimensional region of interest using the land mark K.

Specifically the three-dimensional geometric quantity comprises the following parameter group shown hereinbelow.

1-1) Volume

This parameter represents the volume of the three-dimensional region of interest.

It is presupposed that the Boxel resolution is represented in the unit system such as [mm³] by using the slice pitch (pixel/mm) of the CR/MRI and the pixel resolution (pixel/mm).

This parameter is denoted by Volume. 1-2) Surface

This parameter represents a surface of the three-dimensional region of interest. In the same manner as described above, it is presupposed that the surface unit is represented in the unit system such as [mm³] by using the slice pitch (pixel/mm) of the CR/MRI and the like.

This parameter is represented by surface 1-3) Shape Complexity

This shape complexity is a quantity which can be calculated from the volume and the surface, and can be represented in the following mathematical expression.

$$\text{Shape Complexity} = \frac{\left(\frac{\text{surface}}{4\pi}\right)^{\frac{1}{2}}}{\left(\frac{\text{volume}}{\frac{4}{3}\pi}\right)^{\frac{1}{3}}}$$

The value of the shape complexity becomes larger with an increase in the complexity in the shape. When the shape is a cube, the shape complexity becomes minimum (=1).

1-4) Oblong Approximate Parameter

The secondary moment matrix Mom representing the secondary moment with respect to each point q (coordinates values in the inspection image coordinates) in the three-dimensional region of interest can be expressed in the following mathematical expression.

$$\text{Mom} = \frac{1}{N} \sum_{q \in Q} (q - \bar{q})(q - \bar{q})^T$$

At this time, the length and the direction of the three axes when rendering the three-dimensional region of interest approximate to the oblong is defined as the feature quantity. Now, the length of the three axes are denoted by $a_1$ (the first axis, the longest axis), $a_2$ (the second axis) and $a_3$ (the third axis: the shortest axis). The direction vectors are denoted by $V_1$, $V_2$ and $V_3$.

These parameters are calculated from the secondary moment matrix Mom.

Figure 9:
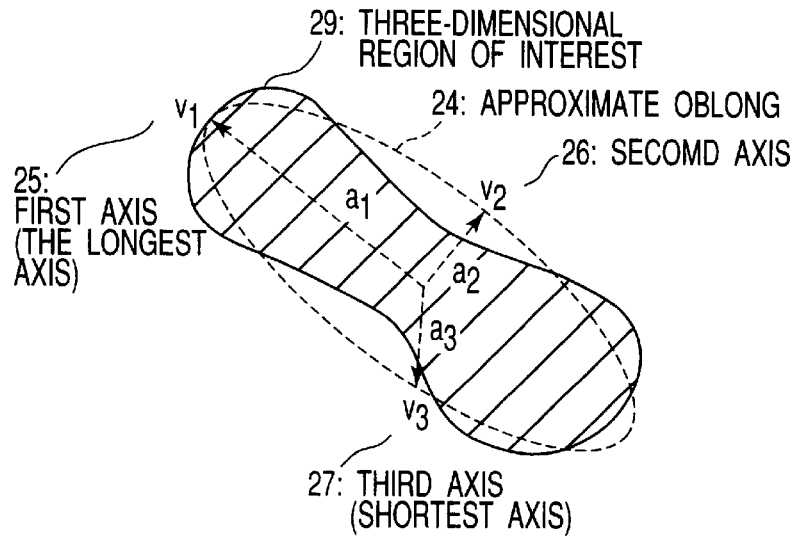
FIG. 9 is a view showing a state in which as a feature quantity calculated with the feature quantity calculation means 8 of FIG. 2, a parameter representing geometric feature with respect to the three-dimensional region of interest is calculated from a secondary moment matrix Mom, the parameter being a three-dimensional geometric feature quantity.

FIG. 9 is a view showing this state.

In FIG. 9, the approximated oblong is generated with respect to the three-dimensional region 23, so that the first axis (the longest axis) 25, the second axis 26, and the third axis 27 are defined.

1-5) The shortest distance dcLj up to each land mark Lj from the center of gravity of the shortest distance three-dimensional region of interest up to the land mark and the shortest distance dnLj each land mark Lj from the surface point of the region of interest up to are represented.

Figure 10:
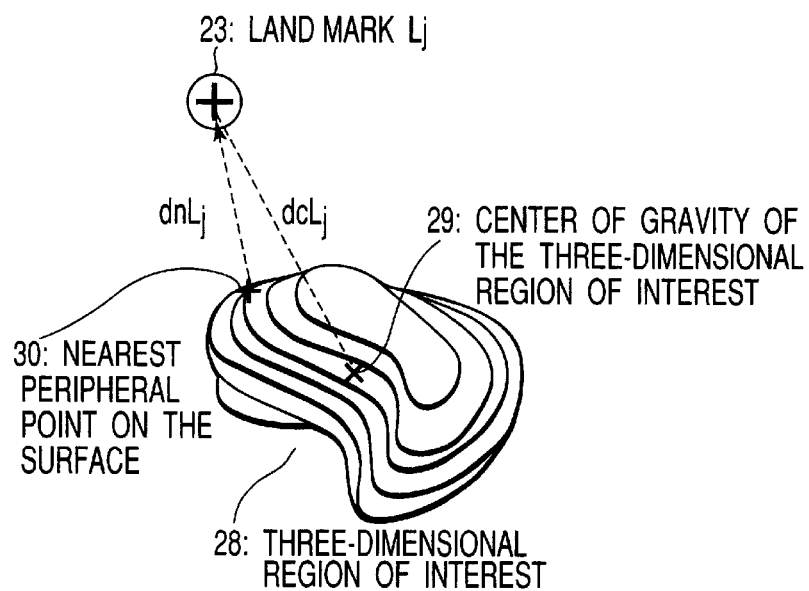
FIG. 10 is a view representing a state in which a shortest distance dcLj up to each land mark Lj from the center of gravity of the shortest distance three-dimensional region of interest up to the land mark, and a shortest distance dnLj up to each land mark Lj from the surface point of the region of interest are calculated in a parameter representing the geometric feature with respect to the three-dimensional region of interest, the parameter being the three-dimensional geometric feature quantity using the three-dimensional region of interest Q and the land mark L as the feature quantity calculated with the feature quantity calculation means 8 of FIG. 2.

FIG. 10 is a view showing this state.

In FIG. 10, the distance dcLj up to the land mark from the center of gravity 29 of the three-dimensional region of interest, and the distance dnLj up to the land mark Lj 23 from the most approximate peripheral point 30 on the surface of the three-dimensional region of interest are given to the three-dimensional region of interest 28 and the land mark Lj.

1-6) Euler Number and Number of Holes

These are phase geometric parameters such as the number of holes nHole and Euler number nEuler which are present in the three-dimensional region of interest.

2) Density Feature Quantity

This density feature quantity represents the statistical value with respect to the contrast value of each Boxel included in the three-dimensional region of interest Q, and specifically following quantity can be given.

2-1) Histogram Obtained from the Density Distribution

Here, the density histogram refers to a normalized histogram obtained by preparing in advance a plurality of boxes (bins) constituting the histogram corresponding to the density value, measuring the value as to which bin the density value of each boxel in the three-dimensional region of interest Q belongs to, and dividing the number of bins with the sum total of the general boxel number ($N_Q$).

For example, in the case where the density value can be represented in 8 bits, and the bin constituting the histogram is prepared in sixteen (bin1, bin2, . . . , bin16), bin1 is rule out at the density value of 0–15, bin2 can be ruled out at the density value of 16–31, bin3 can be ruled out at the density value of 32–47, bin16 can be ruled out at the density value of 240–255.

When the boxel numbers in the three-dimensional region of interest Q which belongs to each bin are denoted by $f_1$, $f_2$, . . . , $f_{16}$, the normalized density histogram is denoted by sixteen parameters $hist_1$, $hist_2$, . . . , $hist_{16}$, and can be calculated from the following mathematical expression.

$$hist_1 = \frac{f_1}{N_Q}, hist_2 = \frac{f_2}{N_Q}, \cdots, hist_{16} = \frac{f_{16}}{N_Q}$$

2-2) Density Mean Value (grayMean), Concetration Standard Deviation (grayStd), Density Skewness (graySkewness), and Density Kurtosis (grayKurtosis)

Here, the density means value (grayMean) represents the density mean value corresponding to boxel in the three-dimensional region of interest Q.

That is, the density mean value can be represented in the following mathematical expression by using the density value gray (q) corresponding to each boxel.

$$grayMean = \frac{1}{N_Q} \sum_{q \in Q} gray(q)$$

Furthermore, the density standard deviation (grayStd) represents the standard deviation of the density value corresponding to boxel in the three-dimensional region of interest Q.

That is, the density standard deviation (grayStd) can be represented in the following mathematical expression by using the density value gray (q) corresponding to each boxel q.

$$gray\,Std = \sqrt{\frac{1}{N_Q - 1} \sum_{q \in Q} (gray(q) - gray\,Mean)^2}$$

On the other hand, the density skewness (graySkewness) is a parameter showing the deviation of the density deviation.

$$gray\,Skewness = \frac{\sqrt{N_Q} \sum_{q \in Q} (gray(q) - gray\,Mean)^3}{\left[ \sum_{q \in Q} (gray(q) - gray\,Mean)^2 \right]^{\frac{3}{2}}}$$

Lastly, the density kurtosis (grayKurtosis) is a parameter showing the sharpened density distribution.

$$gray\,Kurtosis = \frac{N_Q \sum_{q \in Q} (gray(q) - gray\,Mean)^4}{\left[ \sum_{q \in Q} (gray(q) - gray\,Mean)^2 \right]^2}$$

3) Texture Feature Quantity

This texture feature quantity shows a density dependency relationships between boxels in the three-dimensional region of interest.

3-1) Texture Parameter

A texture expression with respect to the two-dimensional region of interest includes a co-occurrence matrix represented in literature 1. The texture parameter of the two-dimensional region of interest can be represented by using this matrix.

The co-occurrence matrix in the case of two-dimensional image QS shows which value the density value become with respect to two pixels separated in a distance of n and through an angle of θ at what ratio.

Specifically, the co-occurrence matrix can be represented in the following mathematical expression.

$P_{ij}(d,\theta) = \#\{[(k,p),(m,n)]:(j,k) \in Q_S,(m,n) \in Q_S,$ distance[(k,p),(m,n)]=d, orientation[(k,p),(m,n)]=θ, gray(k,p)=i,gray(m,n)=j$\}/N(d,\theta)$ Here, distance is a function representing a distance between the pixel (k, p) and the pixel (m, n) orientation is a function representing an angle of direction of the pixel (k, p) and the pixel (m, n). Gray(k, p) denotes a density value in the pixel (k, p), and N(d, θ) denotes the sum total of two pixels which are constituted in pairs with the distance d and an angle θ defined in the region of interest.

The following parameters which characterize the texture can be calculated by using this co-occurrence matrix.

Energy

Entropy

Homogeneity

Contrast

Correlation

Cluster tendency

Specifically, the parameters can be represented in the following mathematical expressions.

$$energy = \sum_{i,j} p_{ij}^2, \; entropy = \sum_{i,j} P_{ij} \log p_{ij},$$

$$homogeneity = \sum_{i,j} \frac{p_{ij}}{1 + |i - j|} \; contrast = \sum_{i,j} |i - j|^2 p_{ij}^2,$$

$$correlation = \sum_{i,j} \frac{(i - \mu)(j - \mu) p_{ij}}{\sigma^2},$$

$$cluster\,tendency = \sum_{i,j} (i + j - 2\mu)^2 p_{ij}$$

Here, $\mu$ denotes a mean value, and $\sigma$ denotes a standard deviation.

The above texture parameter can be calculated out with respect to the three-dimensional region of interest.

That is, the above texture parameter is calculated with respect to the two-dimensional region of interest Qi constituting the three-dimensional region of interest Q, and the texture parameter corresponding to the three-dimensional region of interest is calculated by averaging the parameters with the addition of the weight in consideration of the two-dimensional area over Q.

That is, the following parameters are calculated by averaging the above parameters.

3-1-1) texture Energy
3-1-2) texture Entropy
3-1-3) texture Homogeneity
3-1-4) texture Contrast
3-1-5) texture Correlation
3-1-6) texture Cluster Tendency As has been explained, each kind of feature quantity can be calculated with respect to the three-dimensional region of interest.

In actuality, only feature quantity effective for retrieval can be used with respect to each kind of feature quantity, so that the effective feature quantity can be represented in a vector.

These parameters is represented in an H-dimension vector comprising $p=[p_1, p_2, \ldots p_m, \ldots p_M]^T$, and is named features vector.

Then, when the three-dimensional region of interest is given, the feature quantity calculation means 8 calculates the features vector $p=[p_1, p_2, \ldots p_m, \ldots p_M]^T$ with respect to the region.

For example, as feature quantity, the volume, the shape complexity, the longest axis (al), the density mean value (grayMean), the density standard deviation (grayStd), the texture homogeneity, and the texture contrast are adopted, the features vector p can be represented in the following mathematical expression.

$$p = \begin{bmatrix} p_1 \\ p_2 \\ p_3 \\ p_4 \\ p_5 \\ p_6 \\ p_7 \end{bmatrix} = \begin{bmatrix} \text{volume} \\ \text{ahape Compexity} \\ a_1 \\ \text{gray Mean} \\ \text{gray Std} \\ \text{texture Homogenuity} \\ \text{texture Contrast} \end{bmatrix}$$

(3) Similarity Calculation and Image Selection Means 9

The feature quantity calculation means 8 calculates the feature vector shown below with respect to the three-dimensional region of interest r which forms a reference of retrieval.

$$p^r = [p_1^r, p_2^r, p_1^r, \ldots, p_m^r, \ldots, p_{1M}^r]$$

On the other hand, the feature quantity is calculated in advance in such a form with respect to the three-dimensional image stored in the image database 3.

That is, suppose that the feature vector $p(k)=[p_1(k), p_2(k), \ldots, p_m(k), \ldots, p_{1M}(k)]$ is calculated with respect to the three-dimensional image stored in the image database 3.

In the image feature quantity storage file 14 shown in FIG. 2, the features vector is stored together with information associated with the three-dimensional information included in the image database 3.

At this time, as shown in FIG. 2, the similarity calculation and image selection means 9 calculates similarity with the reference three-dimensional image with respect to each of the three-dimensional image k registered in the image feature quantity storage file 14, selects the three-dimensional image having a large similarity, and sends the result to the image display means 10 as similarity and image selection information 15.

Next, a method of calculating the similarity will be explained.

In actuality, dissimilarity is calculated in the place of similarity.

It is evaluated that the similarity is larger with a decrease in dissimilarity.

Now, the dissimilarity between the features vector $p^r$ and $p(k)$ is defined as the distance function in the form of the following mathematical expression.

$$\text{dissimilarity}(p(k),p^r)=(p(k),-p^r)^T C^{-1}(p(k)-p^r) \quad \text{(A)}$$

Here, C is a matrix of M×M, and represents the generalized co-distribution matrix of the features vector. $C^{-1}$ in the above mathematical expression denotes a reverse function of C.

The effective addition of the feature quantity can be added by changing the parameter of C.

Or, another definition of the dissimilarity can be given in the following mathematical expression.

$$\text{dissimilarity}(p(k), p^r) = \sum_{m=1}^{M} W_m \frac{(p_m(k) - p_m^r)^2}{\sigma_m^2} \quad \text{(B)}$$

Here, $\sigma_m$ denotes a standard deviation of m component of the feature vector, and $W_m$ denotes the weighting coefficient with respect to the m component of the features vector.

In the same manner, the effective weight of the feature quantity can be added by changing Wm.

A method for determining such weighting coefficient includes a method described in literature 4:"The Customized-Queries Approach to CBIRsing EM" by J. G. Dy, C. E. Brodley, A. Kak, C. Shyu, and L. S. Brodrick in pages 400 through 406 of the Proceeding of IEEE Conference on Computer Vision and Pattern Recognition, Vol. II, June 1999, Fort Collins, Colo., U.S.A.

As described above, with respect to each of the three-dimensional images k in the image database, the dissimilarity with respect to the reference three-dimensional image r is calculated, and the three-dimensional image in the image database is selected in an order of decreasing dissimilarity (in an order of decreasing similarity).

Or, only n images having small dissimilarity are selected from within the image database 3.

In this manner, a method for selecting images in the order of decreasing dissimilarity, and selecting n images having small dissimilarity is clear so that the explanation thereof is omitted here.

The indices of the three-dimensional images which are selected as described above are denoted by $i_1, i_2, \ldots, i_j, \ldots, i_n$ in an order of decreasing similarity (or in an order of increasing dissimilarity). Then, the dissimilarity associated with the three-dimensional image 1 and the reference three-dimensional image Γ are denoted by $d(i_j)$.

The dissimilarity calculation and image selection means sends the similarity image selection information 15 to the image display means 10 in the form of the retrieval result storage stack $\{(i_1 d(i_1)), (i_2 d(i_2)), \ldots, (i_n d(i_2))\}$.

FIG. 11 is a view showing a flowchart for explaining a processing order of the similarity calculation and image selection means 9.

In FIG. 11, in the beginning, at step S21, the image feature quantity storage file is input from the image database 3, and the sum total of the three-dimensional image stored in the file is denoted by $n_f$.

Next, at step S22, the features vector p$^r$ with respect to the reference three-dimensional image is input from the feature quantity calculation means 8.

Next, at step S23, the maximum number n of images to be retrieved is determined.

Next, at step S24, the retrieval result storage stack (size n) is prepared, and the stack thereof is initialized (NULL).

Next, at step S25, the index k of the three-dimensional image retrieved in the image feature quantity storage file is initialized at zero (0).

The above description shows the initialization processing, and the similarity calculation and image selection processing is conducted at step S26, S27, S28 and S29.

In the beginning, at step S26, judgment is made as to whether the image indices k exceed the sum total n$_f$ of the images. When the image indices exceed the sum total n$_f$ of the images, the process proceeds to step S30. When the image indices do not exceed the sum total n$_f$ of the images, the process proceeds to step S27.

At step S27, the dissimilarity d (K) between the reference three-dimensional image p$^r$ and the three-dimensional image (index k) is calculated.

Next, at step S28, the three-dimensional image index k and the dissimilarity d(k) are inserted into the retrieval result storage stack in an increasing order with respect to d(k).

At this time, since the maximum number of the stack is n, the image having the largest dissimilarity is eliminated in the case where the overflow of the stack is generated and the number of images exceeds the stack number.

Next, at step S29, the image indices are increased by 1, the process returns to step S26.

On the other hand, upon arrival at step S30, the calculation of the similarity is completed with respect to all the three-dimensional images. All the processing is completed by outputting the retrieval result storage stack to the image display means 10.

(4) Image Display Means 10

The image display means 10 retrieves the three-dimensional images i$_1$, i$_2$, ..., i$_j$, ..., i$_n$ from the inside of the image database 3 so that the content is sent to the retrieval result display device 4 to be displayed by using the retrieval result storage stack {(i$_1$d(i$_1$)), (i$_2$d(i$_2$)), ..., (i$_n$d(i$_2$))} of the similarity image selection information 15 calculated with the similarity calculation and image selection means 9.

Figure 12:
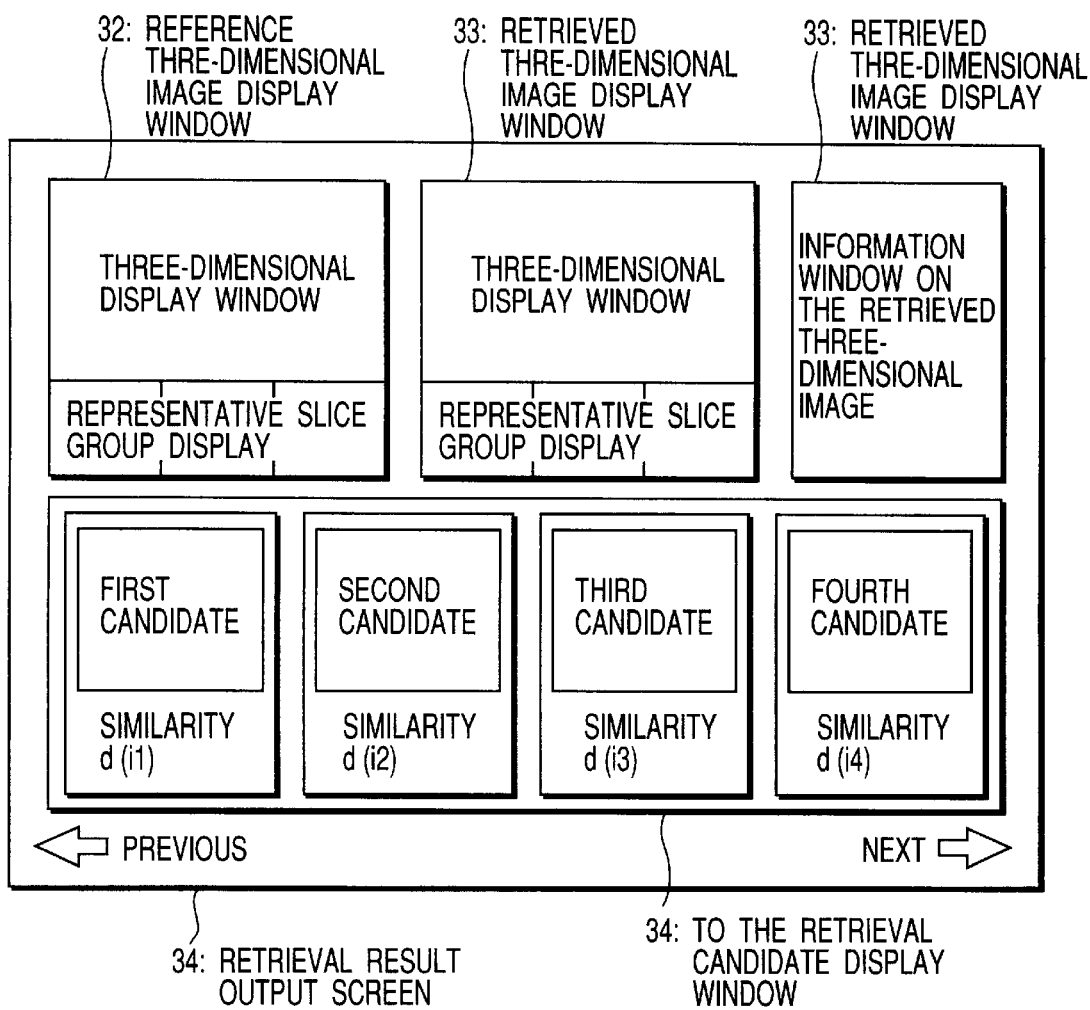
FIG. 12 is a view showing one example of a display screen represented with the image display means 10 of FIG. 2.

FIG. 12 is a view showing an example of this display screen.

In FIG. 12, the retrieval result output screen 31 comprises a "reference three-dimensional image display window 32", the "retrieved three-dimensional image display window 33" for displaying in detail the retrieved three-dimensional image and the information thereof, and a "retrieval candidate result display window 34" for arranging the retrieved three-dimensional image candidate to be displayed on a small screen.

The "reference three-dimensional image display window 32" includes the three-dimensional display of the reference three-dimensional image and the display of the representative slice display, and "retrieved three-dimensional image display window 33" displays in detail one of the candidate three-dimensional image in the retrieval candidate result display window 34.

At this time, the display of the representative slice group image is also included in addition to the three-dimensional display of the three-dimensional images.

Furthermore, information which is desired to be referenced after retrieval such as each kind of information (for example, body information on the subject, information on the lesion portion or the like) included in the retrieved three-dimensional image is displayed.

The user 6 can visually easily and effectively examine the retrieval result of the three-dimensional image by taking such display form.

As has been described above, according to the first embodiment, a more accurate similar image retrieval is enabled by effectively using the information on the three-dimensional region of interest with respect to the CT/MRI three-dimensional image which can be retrieved only with the conventional two-dimensional slice image.

Furthermore, the retrieval result can be examined visually easily and effectively by displaying the retrieval result in a three-dimensional manner.

So far, the medical use images have been explained. However, it goes without saying that the same processing is enabled with respect to the image form having the same structure as CT's/MRI's.

Second Embodiment

In the above first embodiment, the similarity calculation and image selection means 9 calculates the similarity in the method shown in the mathematical expression (A) and the mathematical expression (B).

However, in specific image database, there is a case in that a key word or the like is added to each of the images in advance.

For example, in the case of the medical use image database, there are many cases in which the key word such as cases or the like is set in advance.

In the retrieval of such a case, the image retrieval is conducted in the category of cases. At the time of calculating the similarity expressed in the mathematical expression (A) or the mathematical expression (B), it becomes important to input similar image group from the image database by calculating the similarity with respect to only the images with which the key word agrees in the first retrieval, after conducting the first retrieval by means of such key word.

In the second embodiment, this method will be explained.

In the three-dimensional region of interest setting means 7 shown in FIG. 2, a key word list determined in advance is presented to the user at the time of setting the region of interest of the reference three-dimensional image.

Suppose that the key word list comprises KEYS={key1, key2, key3, ..., keyN}.

The user 6 is to select at least one key word corresponding to the three-dimensional region of interest out of the key word list.

The key word selected in this manner is set to KEYR={keyr 1, Kery 2, Keyr 3, ..., keyn}.

The three-dimensional region of Interest setting means 7 sends this key word set KEYR together with the three-dimensional region of interest prepared in the first embodiment to the feature quantity calculation means 8.

This feature quantity calculation means 8 sends the key word set KEYR of the three-dimensional region of interest to the similarity calculation means 9 together with the features vector.

On the other hand, the similarity calculation and image selection means 9 receives the features vector and the key word set KEYR sent by the feature quantity calculation means 8 to compare the features vector and the key word set KEYR with the three-dimensional image stored in the image database 3 by using this information.

The image feature quantity storage file stored in this image database 3 stores the key word set KEY (k) added to each of the three-dimensional image and the features vector, so that this image feature quantity storage file is input in advance in the similarity calculation and image selection means.

Figure 13:
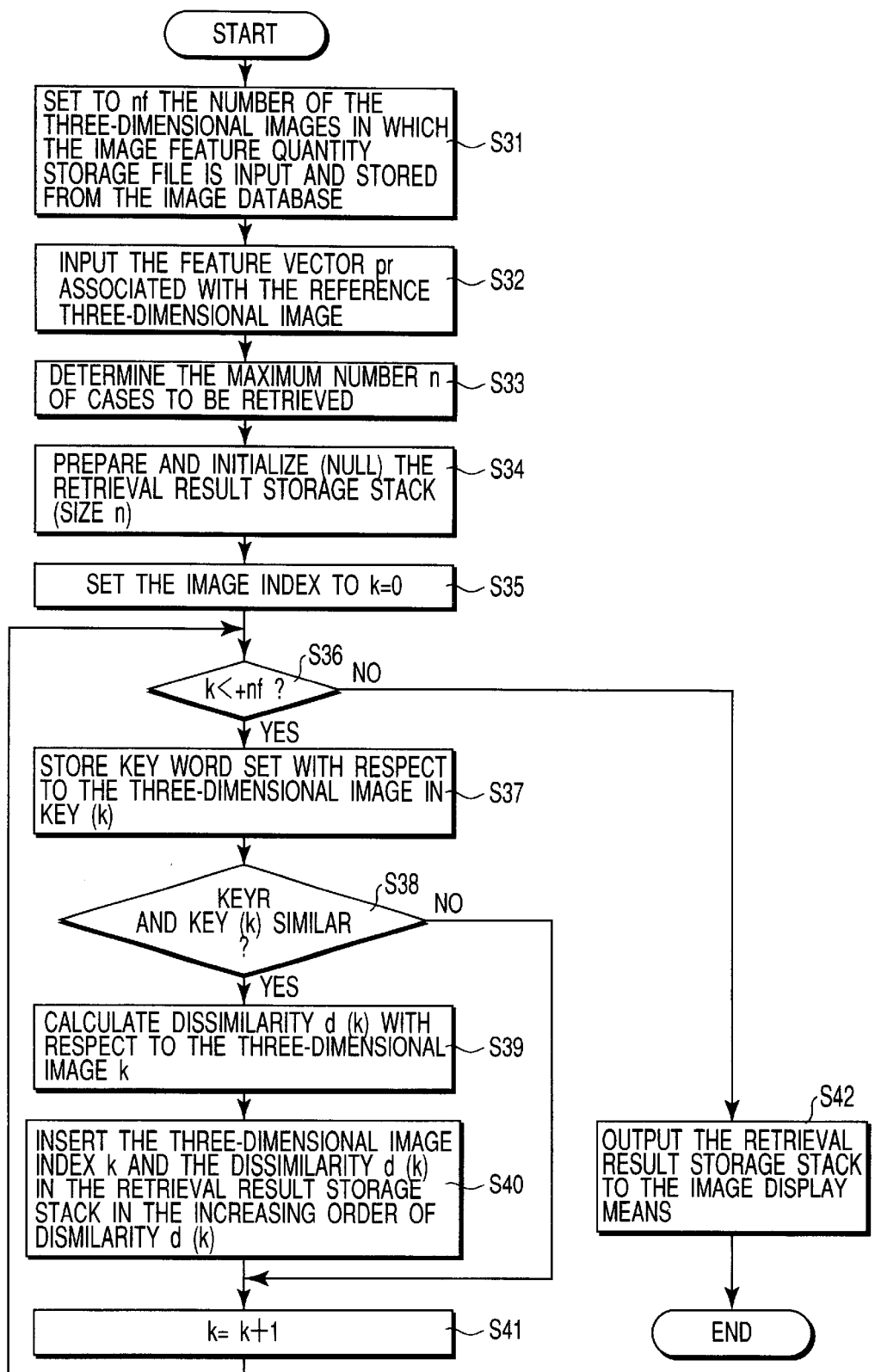
FIG. 13 is a flowchart for explaining a processing procedure according to the second embodiment of the present invention, in particular, a flowchart at a the similarity calculation and image selection means 9 of FIG. 2.

FIG. 13 is a view showing a flowchart for explaining a processing procedure according to such second embodiment, in particular, a flowchart at the similarity calculation and image selection means 9.

In FIG. 13, in the beginning, at step S31, the image feature quantity storage file is input from the image database 3 so that the sum total of the three-dimensional images stored in the file is set to $n_f$.

Next, at step S32, the key word set KEYR with respect to the reference three-dimensional image and the features vector $p^r$ is input from the feature quantity calculation means 8.

Next, at step S33, the maximum number n of images to be retrieved is determined.

Next, at step S34, the retrieval result storage stack (size n) is prepared, so that the stack is initialized (NULL).

Next, at step S35, the index k of the three-dimensional image stored in the image feature quantity storage file is initialized at zero (0).

The above processing is the initialization processing. At the following steps S36, S37, S38, S39, S40 and S41, the similarity calculation and the image selection processing is conducted.

In the beginning, at step S36, judgment is made at to whether the image index k exceeds the sum total $n_f$ of the images. When the image index k exceeds the sum total $n_f$ of the images, the process proceeds to step S32. When the image index k does not exceed the sum total $n_f$ of the images, the process proceeds to step S37.

At this step S37, the key word set of the three-dimensional image (index k) is stored in KEY (k).

Next, at step S38, confirmation is made as to whether the key word sets are similar to each other between the reference three-dimensional image pr and the three-dimensional image (index k).

In the confirmation of this similarity, the following check can be considered.

Case 1) to check as to whether all the key words of KEYR and KEY(k)

Case 2) to check as to whether all the key words in the KEYR are included in the KEY(k).

Case 3) to check as to whether at least S key words in the KEYR are included in the KEY(k) This means that (both common key words are available in S).

Which is selected out of the above references depends upon the field of application. For example, case 3 is cited as an example, and the following explanation will be made.

With respect to the three-dimensional images (k) with which the similarity by the key word is confirmed, the process proceeds to step S39. In other cases, the process proceeds to step S41.

In the beginning, at step S39, the dissimilarity between the reference three-dimensional images $p^r$ and the three-dimensional images (index k) is calculated.

Next, at step S40, the three-dimensional index (k) and the dissimilarity d(k) are inserted into the retrieval result storage stack in an increasing order with respect to d(k).

At this time, since the maximum number of the stack n is n, the images having the largest dissimilarity is automatically eliminated when the overflow of the stack is generated, namely, when the image number exceeds the stack number.

Next, at step 41, the image index is incremented by 1, and the process returns to step 36.

On the other hand, upon arrival at step S42, since the calculation of similarity is completed with respect to all the three-dimensional images, the retrieval result storage stack is output to the image display means 10 so that all the processing is completed.

Lastly, the retrieval result storage stack calculated in this manner is sent to the image display means 10 as similarity and image selection information 15.

Then, in the image display means 10, in the same manner as the case of the first embodiment, the result to be displayed is input from the image database 3, so that the result is displayed on the retrieval result display device 4.

As has been described above, it becomes unnecessary to calculate similarity (or dissimilarity) with respect to all the images in the database by effectively using the key word added to the three-dimensional image with the result that there is provided an advantage in that a higher processing is enabled and, at the same time, images with which no key word clearly does not agree are eliminated and more accurately retrieved.

Third Embodiment (Normalization of Geometric Features Using the Standard Model)

In the method explained in the first embodiment, each kind of geometric features are treated which are defined in the inspection image coordinates system.

In this case, the following problems exist.

1) When photographing condition of the inspection images of the CT's and the MRI's, the subject is not necessarily arranged at the same position to photograph the images.

2) The size of the body location (for example, brain) of the subject is varied, and it is sometimes difficult to directly compare part of the geometric features.

In the third embodiment, there is provided a method for providing a similar image retrieving apparatus for retrieving a three-dimensional similar image in consideration of such variation in the body and variation of the photography condition.

Specifically, a three-dimensional standard model of an object which forms an object of comparison is prepared in advance, and coordinates system peculiar to the three-dimensional standard model is defined in advance.

Then, the conversion to the standard model coordinates is considered with respect to the three-dimensional reference image and each of the three-dimensional image stored in the image database, and the similarity thereof is calculated with respect to the transformed three-dimensional reference image and the three-dimensional storage image so that images are retrieved on the basis of the calculated similarity (dissimilarity).

Hereinafter, this method will be explained.

As has been explained in the first embodiment, the body features which are referred to as the land mark can be set in the CT/MRI inspection images.

Such body features are referenced with the three-dimensional standard model so that a conversion between the three-dimensional standard model and the individual three-dimensional image is considered.

That is, in the method explained in this embodiment, such land mark works to enable modeling in such standard model, so that in the standard model coordinates ruled out by the standard model the three-dimensional coordinates of such land mark can be given.

Now, this standard model coordinates system is named M and the original point is denoted by OM.

Then, the three-dimensional coordinate values of the land marks Mi defined in this standard model coordinates system are named $M_1, M_2, \ldots, M_m$ (m is an integer) are set to $(x_i^M, y_i^M, z_i^M)$ (i=1, 2, ..., m).

On the other hand, with respect to the three-dimensional reference image to be referenced and the three-dimensional image stored in the image database 3, the geometric features of the imaged are defined within the inspection image coordinates system defined at the time of the photography of respective inspection images.

Now, suppose that the three-dimensional image is denoted by A, and the land marks set in the three-dimensional image are denoted by A1, A2, ..., Aa.

Here, the three-dimensional positions of the land marks in the inspection image coordinates system A ruled out by the peculiar inspection are set to $(x_i^A, Y_i^A, z_i^A)$. (i=1, 2, ..., a).

Here, a coordinates transformation is considered from the inspection image coordinates system A to the standard coordinates system M.

That is, supposing that arbitrary points $(x^A, y^A, Z^A)$ in the inspection coordinates system A is transformed into the standard model coordinates system, and the coordinates values in the standard model coordinates system are set to $(x^M, y^M, z^M)$, it is presupposed that the coordinate conversion is approximately represented in the affine transformation which is represented in the following mathematical expression.

$$\begin{bmatrix} x^M \\ y^M \\ z^M \end{bmatrix} = \alpha \left( R \begin{bmatrix} x^A \\ y^A \\ z^A \end{bmatrix} + t \right)$$

Here, $\alpha$, R and t are constants, $\alpha$ is a scale constant, R is a rotation matrix of the coordinates conversion and t is a translation vector.

Determination of these constants $\alpha$, R and t is equivalent to the ruling out of the coordinates transformation.

In this embodiment, these constants are determined from the correlation of the land marks.

Now, the land marks set in the inspection coordinates system A are set to A1, A2, ..., Aa. The land marks at the corresponding standard model coordinates are set to M1, M2, ..., Ma (This is reconstructed by arranging the above land marks).

When the above mathematical expression is used, the following mathematical expression must be established with respect to all the land mark corresponding points (i=1, 2, ..., a).

$$\begin{bmatrix} x_i^M \\ y_i^M \\ z_i^M \end{bmatrix} = \alpha \left( R \begin{bmatrix} x_i^A \\ y_i^A \\ z_i^A \end{bmatrix} + t \right)$$

Hereinafter, the method for calculating the constants $\alpha$, R and t will be explained.

Suppose that the centers of gravity of both land mark groups are set to $(x_c^A, Y_c^A, z_c^A)$ and $(X_c^M, y_c^M, Z_c^M)$.

Then, the above mathematical expression can be transformed into the following mathematical expression.

$$\begin{bmatrix} x_i^M - x_c^M \\ y_i^M - y_c^M \\ z_i^M - z_c^M \end{bmatrix} = \alpha R \begin{bmatrix} x_i^A - x_c^A \\ y_i^A - y_c^A \\ z_i^A - z_c^A \end{bmatrix}$$

Here, the following mathematical expressions are set.

$$d_i^M = \sqrt{(x_i^M - x_c^M)^2 + (y_i^M - y_c^M)^2 + (z_i^M - z_c^M)^2},$$

$$d_i^A = \sqrt{(x_i^A - x_c^A)^2 + (y_i^A - y_c^A)^2 + (z_i^A - z_c^A)^2}$$

Since the size of the vector does not change in the rotation matrix R, $d_i^M = \alpha d_i^A$ is established, so that a can be calculated from the following mathematical expression.

$$\alpha = \frac{1}{a} \sum_{i=1}^{a} \frac{d_i^M}{d_i^A}$$

When a is determined in this manner, $(x_c^A, y_c^A, Z_c^A)$ and $(x_c^M, y_c^M, z_c^M)$ are normalized with the center of gravity and a, so that the following mathematical expression is established.

$$\begin{bmatrix} \tilde{x}_i^M \\ \tilde{y}_i^M \\ \tilde{z}_i^M \end{bmatrix} = \begin{bmatrix} x_i^A - x_c^A \\ y_i^A - y_c^A \\ z_i^A - z_c^A \end{bmatrix} \begin{bmatrix} \tilde{x}_i^A \\ \tilde{y}_i^A \\ \tilde{z}_i^A \end{bmatrix} = \begin{bmatrix} \dfrac{x_i^A - x_c^A}{\alpha} \\ \dfrac{y_i^A - y_c^A}{\alpha} \\ \dfrac{z_i^A - z_c^A}{\alpha} \end{bmatrix}$$

Then, the mathematical expression shown below is established.

$$\begin{bmatrix} \tilde{x}_i^M \\ \tilde{y}_i^M \\ \tilde{z}_i^M \end{bmatrix} = R \begin{bmatrix} \tilde{x}_i^A \\ \tilde{y}_i^A \\ \tilde{z}_i^A \end{bmatrix}$$

With respect to i=1, 2, ..., a, the method for determining this equation is already known.

For example, there is available the quaternion method.

The details of this method are described in literature 5:"Closed-Form Solution of Absolute Orientation Using Unit Quaternions," by B. K. P. Horn, in Journal of Optical Society of America A, Vol. 4, No. 4, 1987, pp 629–642). The details thereof are omitted here.

When R is calculated in this manner, t can be determined in the following manner.

$$t = \begin{bmatrix} \dfrac{x_c^N}{\alpha} \\ \dfrac{y_c^M}{\alpha} \\ \dfrac{z_c^M}{\alpha} \end{bmatrix} - R \begin{bmatrix} x_i^A \\ y_c^A \\ z_c^A \end{bmatrix}$$

Thus, when constants $\alpha$, R and t are determined in this manner, each kind of geometric features can be considered in the standard model coordinates system.

Hereinafter, with respect to the above points, the feature quantity calculation means 8, and the similarity calculation and image selection means will be primarily explained which constitute the engine 2 for retrieving similar images.

(1) Feature quantity Calculation Means 9

As geometric features, new features shown hereinbelow can be considered in addition to the features explained in the first embodiment.

1) The position of the center of gravity Centroid in the three-dimensional region in the standard model coordinates system $$(\text{model}) = q_c^M, (x_c^M, y_c^M, z_c^M)$$

When the positions of the center of gravity of the three-dimensional region in individual inspection image coordinates system A are set to $(x_c^A, Y_c^A, z_C^A)$, the position of the center of gravity Centeroid (model)=(model)=$q_c^M$, $(x_c^M, Y_c^M, z_c^M)$ can be transformed into the following mathematical expression.

$$\text{Centroid(model)} = \begin{bmatrix} x_c^M \\ y_c^M \\ z_c^M \end{bmatrix} = a \left( R \begin{bmatrix} x_c^A \\ y_c^A \\ z_c^A \end{bmatrix} + t \right)$$

This Centroid (model) is added to the features vector.

2) The j-axis direction vector $V_j^M$ approximate to oblong in the standard model coordinates system The j axis direction $V_j^A$ approximate to the oblong of the three-dimensional region of interest in individual inspection image coordinates A is transformed into $V_j^M = R v_j^A$ in the standard model coordinates system M.

This j axis direction vector $V_j^M$ is added to the features vector.

3) The relative position $\Delta q_j^M$ between the three-dimensional region of interest and the land mark in the standard model coordinates system The position of the center of gravity of the three-dimensional region of interest in the standard model coordinates system is given by $q_c^M$, $(x_c^M, y_c^M, Z_c^M)$, and the position of the land mark Kj in the standard model coordinates M can be given by $q_j$, $(x_j, Y_j, z_j)$.

In order to describe these relative positions, the relative position vector $\Delta q_j^M = q_j^M - q_c^M$ from the position of the center of gravity Lj to the land mark Lj is newly added to the feature vector.

Three kinds of new features have been explained so far. However, it goes without saying that the features representing the geometric characteristic can be considered in addition to them.

The feature quantity calculation means 8 constitutes a new feature vector including a new feature quantity which is newly added as described above.

Then, it follows that the feature vector will be calculated with respect to the reference three-dimensional region of interest and the region of interest of each of the three-dimensional images included in the image database.

(2) The Similarity Calculation and Image Selection Means 9

The similarity calculation and image selection means 9 uses the feature vector including the newly added feature quantity to calculate similarity with respect to the two three-dimensional images.

At this time, unlike the first embodiment, since it is difficult to calculate an effective similarity only by taking a difference from the newly added feature vector, a new function which will been defined hereinbelow is defined, so that a similarity element further defined with the function will be calculated and a general similarity (dissimilarity) will be calculated.

A new function calculated from this feature vector can be defined in the following manner.

1) Angle Difference of the First Axis Vector Approximate to Oblong in the Standard Model Coordinates System The first axis vector in the standard model coordinates k of the reference three-dimensional image Γ is denoted by $V_1^r$ and the first vector in the standard model coordinates of the image k in the image database 3 is denoted by $V_1^k$, the angle difference $\Delta\theta_k$ can be defined as follows.

$$\Delta\theta_k = \cos^{-1} \frac{v_1^r \cdot v_1^k}{\|v_1^r\| \, \|v_1^k\|}$$

This angle difference is set as an element for calculating the dissimilarity.

2) Scale of the Difference of the Relative Position to the Land Mark

A difference in the relative vector $\Delta q_j^r$, $\Delta q_j^r$ from the center of gravity of the three-dimensional region of interest in the standard model coordinates system k of the reference three-dimensional image r up to the land mark Lj is taken, so that the absolute value $\|\Delta q_j^r\| = \|q_j^k, \Delta q_j^r\|$ is calculated.

The scale of the vector difference is set as an element for calculating the dissimilarity.

In the above example, the difference in the feature vector is not directly used. A parameter calculated from the two feature vectors is defined as a function.

Consequently, the dissimilarity (or similarity) will be more generally represented in the following mathematical expression with respect to the feature vector $p^r$ of the reference three-dimensional region of interest and the feature vector p(k) of the region of interest k of the three-dimensional image in the image database.

$$\text{dissimilarity}(p(k), p^r) = \sum_i w_i f_i(p(k), p^r)$$

Here, $f_i(p(k), p^r)$ is an i-th element function of dissimilarity, and w denotes the i-th weighting coefficient.

In the method described above, more accurate retrieval of similar images is enabled which does not depend on the photography condition and which is not affected by deformation or the like.

Claim 4 which will be described later corresponds, in particular, to FIG. 1 through FIG. 12, and the first embodiment. The operation and the advantage thereof go as follows.

More accurate retrieval of similar images is enabled by accurately setting the three-dimensional region of interest desired by the user and calculating the feature quantity which characterizes the inside of the region of interest.

Furthermore, the retrieval result can be examined visually easily and effectively by displaying in a three-dimensional manner the retrieval result.

Claim 5 which will be described later corresponds to FIG. 13 and the second embodiment. The operation and the advantage thereof go as follows.

By effectively using the key word added to the three-dimensional image added to the three-dimensional image, the following advantage can be provided.

1) Higher processing is enabled because it becomes unnecessary to calculate the similarity (dissimilarity) with respect to all the images in the image database.

2) More accurate retrieval of images is enabled because the image which does not clearly correspond to the retrieved data is removed by the key word.

Claim 6 which will be described later corresponds, in particular, to the third embodiment. The operation and the advantage thereof go as follows.

By using a position posture relationships with the standard object model, more accurate retrieval of similar images is enabled which does not depend on the photography condition of the three-dimensional images and which is not affected by the size of the object and the influence of the deformation.

Consequently, as has been explained above, according to the first embodiments 1 through 3, a similar image retrieving apparatus which can be used in three-dimensional medical use images such as MRI's and CT's, or complicated three-dimensional image data or three-dimensional CAD data which can be obtained from a three-dimensional measuring device can be provided, the apparatus treating three-dimensional images and objects in consideration of the region of interest and intention of the user and enabling more accurate retrieval.

Next, embodiments of the three-dimensional image database apparatus, and the method for constructing the three-dimensional image database will be explained.

Fourth Embodiment

Figure 14:
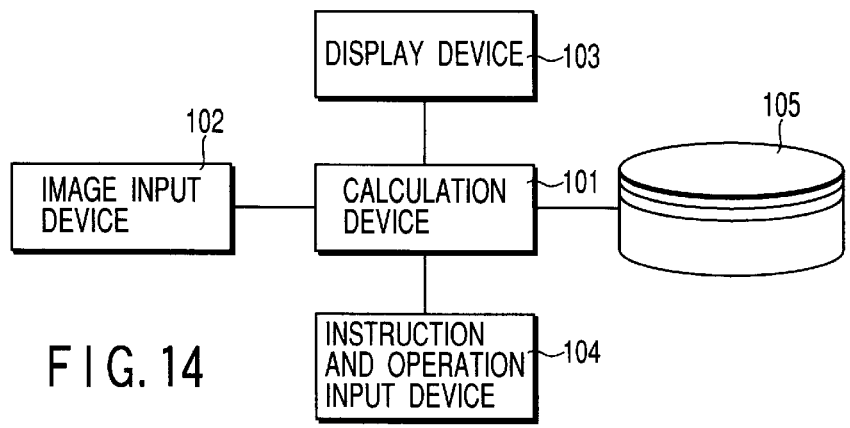
FIG. 14 is a block diagram showing an overall structure of the three-dimensional image database apparatus according to a fourth embodiment of the present invention.

FIG. 14 is block diagram showing a structure of a three-dimensional image database apparatus for a similar image retrieving system according to a fourth embodiment of the present invention.

That is, as shown in FIG. 14, this three-dimensional dimensional database apparatus comprises a calculation device 101, an image (data) input device 102 respectively connected to the calculation device 101, a display device 103, an instruction device 104, and an output database device 105.

Figure 15:
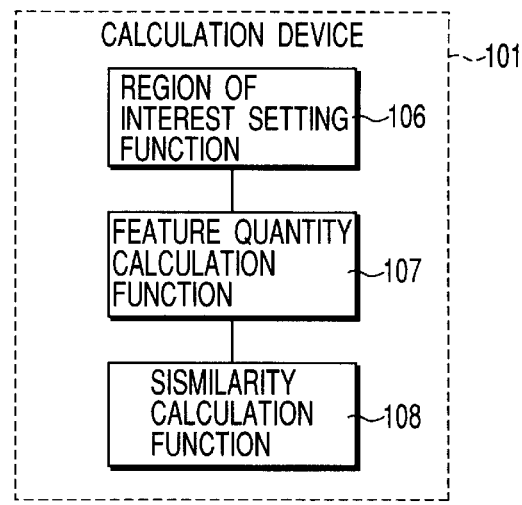
FIG. 15 is a structure view showing a function block of each processing conducted in the calculation apparatus 101 of FIG. 14.

FIG. 15 is a block diagram showing a structure for executing a function of each processing conducted in the calculation device 101 of FIG. 14.

That is, this calculation device 101 comprises an region of Interest setting function portion 106 for conducting calculation for extracting and setting a region of interest in which the feature of the three-dimensional image is to be calculated, a feature quantity calculation function portion 107 for calculating the feature quantity of the region of interest set by the region of Interest setting function portion 106, and a similarity calculation function portion 108 for calculating similarity on the basis of the feature quantity calculated with the feature quantity calculation function portion 107.

In FIG. 14, the image data which is targeted for the retrieval of a similar image is input from the image input device 102 to the calculation device 101.

Here, as the image data to be input with the image input device 102, data such as medical use inspection image such as a CT and a MRI, the data being photographed in an interval of each portion having a section layer slice image, the data forming volume information as a whole set; data for representing a three-dimensional structure as can be seen in CAD data and arbitrary data having three-dimensional data such as data measured with the a device for measuring distance image such as a range finder or the like can be treated.

In FIG. 15, the region of Interest setting function portion 106 in the calculation device 101 extracts as the region of interest the desired position of the user and the designation of the region by using the instruction operation input device 104 with respect to the three-dimensional data as image data input with the image input device 102, namely the volume data, the CAD data and the distance image data.

Furthermore, thus, the feature quantity calculation function portion 107 calculates the feature quantity in a three-dimensional manner with respect to the region of interest set with the region of interest setting function portion 106 in the calculation device 101 in this manner, and furthermore, conserves the feature quantity in the database 105 of FIG. 14 after being associated with the original three-dimensional image data, and the feature quantity data after transforming the object set as the region of interest so as to be visualized in a three-dimensional manner.

Furthermore, the similarity calculation function portion 108 serves as retrieval means for extracting a similar image to calculate similarity in the same manner as the feature quantity calculated from the object image on the basis of the feature quantity calculated with respect to the object image input at the feature quantity calculation function portion 107 with respect to the input reference image, and at the same time to add an order of similarity with data in the database 5 by calculating comparison with data conserved in the database 5 for the retrieval of the similar image.

As has been described above, a central system as a three-dimensional database apparatus for similar image retrieval system is constituted by incorporating the region of Interest setting function portion 106, the feature quantity calculation function portion 107, and the similarity calculation function portion 108 in the calculation portion 101.

FIG. 16 is a flowchart for explaining an overall operation including the means for retrieving a similar image because the method and the apparatus for constructing the three-dimensional image database according to the present invention are used for the system for retrieving the similar image.

That is, FIG. 16 is a flowchart for explaining in detail the flow of the result of the retrieval of the similar image from the above image input up to the display of the retrieval result of the similar images.

On the basis of FIG. 16, each of the function portions 106, 107 and 108 will be explained in detail.

The flow of this processing comprises as a previous processing, two steps; step S109 of setting region of interest from the retrieval object image and calculating the feature, and step S110 of setting conditions, and conducting retrieval.

In the beginning, as the previous processing, at step S111 included in step S109 of setting a region of interest from the retrieval object images and calculating the feature, the three-dimensional image to be retrieved is input from the image input device 102 of FIG. 14 connected to the calculation device 101.

Next, at step S112, the display device 103 of FIG. 14 connected to the calculation device 101 displays the input images.

At this time, in the case where the input data is the volume data, a series of slice images are displayed on the display device 103, so that an arbitrary slice image can be displayed with an operation from the instruction and operation input device 104 of FIG. 14 connected to the calculation device 101.

Furthermore, in the case where the input data is the CAD data, the image rendered in a three-dimensional manner on the display device 103 is displayed.

Furthermore, in the case where the input data is the distance data, the image obtained by photographing the distance image and a region same as the photographed region of the distance image as a color image, or a reflection intensity image, and the image rendered in a three-dimensional manner with the image information are displayed on the display device 103.

Next, at step S113, the region of interest is set with respect to the input image which is targeted of retrieval.

At this time, various techniques are available as a method for setting the three-dimensional region of interest. Primarily, the following techniques (1), (2), (3) and (4) can be considered.

In these techniques (1), (2), (3) and (4), each of the users is allowed to carry out a processing interactively with an instruction device such as an instruction and operation input device 104 or the like while watching a slice image or a three-dimensional image on a display such as a display device 103 or the like.

In the technique (1), the three-dimensional region of interest is set as a whole volume data by setting the region by using an instruction device such as a mouse or the like on the slice image after displaying the volume data on the display device 103 for each of the slice image, by repeatedly setting the region on the slice image with respect to all the slice images and by setting the region of interest with respect to all the slice images.

In the technique (2), the images can be represented in binary values by giving the upper limit and the lower limit threshold value of the image value to the slice image, and, moreover, the image can be represented in multiple values by giving a plurality of sets of the upper limit and the lower limit values thereof.

In this manner, after the image is divided into a plurality of regions, the region of interest is set by designating the region required by the user to set the region of interest.

In the technique (3), each slice is extracted by designating the region including the region of interest after conducting segmentation of the image, so that each slice is set as the region of interest.

In this technique, a step can be used for automatically extracting a region by means of a region extension by referencing the slice image in which the region of interest has been extracted with respect to the intermediate slice image after designating the region with respect to the slices separated by several slices. already extracted.

In the technique (4), the volume data is subjected to three-dimensional rendering by the volume rendering or surface rendering techniques so that the point included in the region of interest is designated with the instruction device within the rendering window, and a certain threshold value is provided on the basis of the pixel point value, so that the region where the difference between the two pixel values are within the threshold value, the region is set as the region of interest and as the three-dimensional object region.

Then, in these techniques (1), (2), (3), (4) or the like, the original volume data is processed and the three-dimensional region of interest is set by setting the volume data as the three-dimensional region of interest volume data so that the three-dimensional region of interest is set.

When the region of interest is extracted with the above techniques, the region such as a noise or the like can be extracted. In such a case, means is also provided for removing the noise region.

For example, there is available a method in which in the case where the region is judged from the size, and a region is extracted which is smaller than a definite size; the region is regarded as a noise.

Next, at step S114, the images are normalized.

For example, medical use inspection images such as CT's and MRI's are targeted as an input image, it is necessary to provide a geometric transformation so that conditions become equal by transforming data after photography because photographing the object at the same position and in the same distance at the time of photographing all the objects is difficult with the result that the function of doing this work becomes the function of normalization.

In this normalization, after the three-dimensional image is selected which forms a reference in advance, or the location is determined which is anatomically known with respect to the position and the structure, a reference image is prepared in which several points P1 through Pn which are to be referenced on the image, so that the points P1' through Pn' provided on the reference image are designated on the image which is targeted.

After setting these points, the image position, and the size can be normalized by subjecting the target image to the processing of rotation, parallel translation, expansion and reduction.

After transforming the image so that a three-dimensional rendering is easily enabled by reconstructing the three-dimensional image by a polygon patch with respect to the extracted object after setting such region of interest and conducting normalization processing, the image is associated with the original image and the image is conserved in the database 105.

Furthermore, in the case where either the input image or the object is given as the distance image, a method for extracting the region of interest by conducting a processing of the region of interest extraction in the same manner as has been conducted with respect to the slice image in the volume data can be used, and furthermore, after calculating a differential geometric curvature used as a geometric feature, namely the Gauss curvature and an average curvature with respect to each of the pixels of the input image, and after displaying the image as an image in which each of the pixels represents the Gauss curvature or an average curvature, the threshold value or the like is processed with respect to these curvature image and the region of interest can be set.

Next, at step S115, the feature quantity of the region of interest of the three-dimensional image is calculated which is set in the above method described above.

At this time, as the three-dimensional feature quantity, the three-dimensional position coordinates P(x,y,z) of the center of gravity of the region of interest, the volume (V) of the region of interest, and the surface (S) of the region of interest are used as the geometric feature, the ratio value of the volume and the surface $S^{1/2}/V^{1/3}$ as a parameter representing the complexity of the shape, and a ratio of the length of three main axes at the time of being approximate to oblong and a direction vectors are represented as a parameter representing three-dimensional directions of the region of interest are used.

Furthermore, as density and texture features, a co-occurrence matrix represented in the mathematical expression (1), a direction secondary Moment calculated from the co-occurrence matrix and represented in the mathematical expression (2) are used. As a three-dimensional ferry feature, MPS (Metric Pattern Signature) represented in the mathematical expression (3) and APS (Angular Pattern Signature) represented in the mathematical expression (4) or the like are used.

$$P_\delta(k,l); \delta=(\delta x, \delta y, \delta z) \qquad (1)$$

Here, k and l denote pixel values which represents the simultaneous generation probability of a phenomenon is represented wherein the pixel value inherent in the pixel separated by δ=(δx, δy, δz) as seen from the pixel having the pixel value of k is 1 is represented.

$$\sum_k \sum_l \{P\delta(k, l)\}^2 \quad (2)$$

$$p(r) = \sum_\theta \sum_\phi P(r, \theta, \phi) \quad (3)$$

$$q(r) = \sum_\theta \sum_\phi P(r, \theta, \phi) \quad (4)$$

P(r, δ, φ) is a function representing in polar coordinates a power specter of a value in the space frequency region after a three-dimensional Furier transformation.

As has been described above, the feature quantity calculated in the processing at step S115 is a peculiar feature any of which is inherent in the three-dimensional image. In addition, any value may be used which represents the three-dimensional features.

Here, in the case where the input image is a three-dimensional image such as a distance image, the average or the like of the surface, volume and each of the curvatures is calculated with respect to the distance image in the region of interest set in the region of interest at step S113 or the curvature image with the result that these quantities can be defined as the feature quantity.

Next, at step S116, the three-dimensional reconstruction is conducted so that the three-dimensional display is provided with respect to the image in which the region of interest is set and the normalization processing is conducted.

At this time, the processing of transforming the surface of the region of interest into a polygon patch and transforming only the region of interest into the volume data corresponds to the processing here.

In the case where the input image is the distance image, as means for three-dimensional reconstruction uses a technique of representing the region of interest with a polygon match.

Here, as the generated polygon patch, a method for generating a polygon such as a triangle or the like in an equal distance, and in accordance with the curvature, a method for generating an appropriate polygon can be used such that the size of the polygon become small with an increase in curvature.

Next at step S117, after data calculated or data set in a series of processing at steps S113, S114, S115, and S116 in this manner is associated with the original three-dimensional image which is to be retrieved, the data is conserved in the database 105.

Then, the desired image is retrieved by referencing the database in which this data is accumulated.

Figure 17:
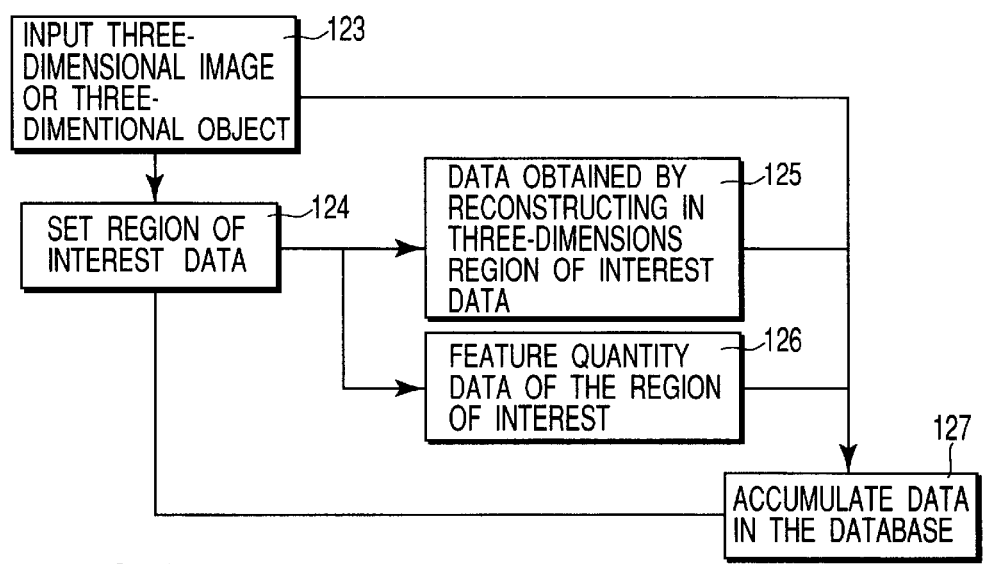
FIG. 17 is a flowchart for explaining a method for constructing first database according to the fourth embodiment of the present invention.

FIG. 17 is a flowchart showing the flow of the database of the prepared data as a first method for constructing database according to the present invention.

That is, at step S123, the input data is input. At step S124, the region of interest set data is prepared, and at step S125, the three-dimensional data is reconstituted with the region of interest set data. At step S126, the feature quantity data of the region of interest is generated. In the state in which at the respective association of all the data is set at steps S123, S124, S125, and S126, the data is accumulated in the database 105 at step S127.

Thus, after the processing at step S109 of FIG. 16 is completed, and the accumulation of the data in the database 105 is completed, the processing at step S110 of FIG. 16 is conducted.

In the beginning, at step S118 included in the step S110 of setting conditions for retrieval, and conducting retrieval, the feature is classified.

Various feature quantities calculated at step S115 can be classified into one group by summarizing similar features, or the feature classified into a certain category.

In this manner, with respect to the features classified into groups, it becomes possible to retrieve images having a similarity with respect to a particular group in the features.

Incidentally, at this time, the group may be constituted with one feature in some cases.

For example, since the surface and the volume can be roughly treated as the size of the region of interest, these features can be set so that the features belong to the same group.

The classification of the features into groups can be conducted by dividing the features into groups using the interface devices such as an instruction and operation input device 104, a keyboard or the like after all the calculated features are displayed on the display device 103.

As a result of dividing the features into groups, features can be classified into groups $G_1-G_k$, and each group can be constituted of k groups $n_{G1}, n_{G2}, \ldots, n_{Gk}$, so that the features can be classified into groups G1: $\{f_{11}, f_{12}, \ldots, f_{inG1}\}$.

Next, at step S119, the weighting coefficient of the features can be set.

That is, by considering the importance of each feature, the retrieval result can be obtained which reflects the intention of the user.

For example, images having similar volume can be retrieved when images are retrieved by the emphasis on the weighting coefficient in consideration of the fact that the feature quantity such as the volume of the region of interest is important.

In this processing as well, after all the features calculated on the display device 103 is displayed, a dialog display is provided for setting the weighting coefficient with the result that the weighting coefficient can be set with respect to each of the features.

Here, the weighting coefficient can be set individually with respect to each of the features. Furthermore, the weighting coefficient can be also set with respect to the grouping for each of the features conducted at step S116.

FIG. 18 is a view showing a dialog box D1 for setting weighting coefficient with respect to each of the features.

That is, in this case, the weighting coefficient value can be provided with the dialog box D1 displayed on the display device 103 by using an instruction and operation input device 104 such as a mouse or the like.

FIG. 19 shows a dialog box D2 for setting the weighting coefficient with respect to each group.

That is in this case, the weighting coefficient value can be provided with the dialog box D1 displayed on the display device 103 by using an instruction and operation input device such as a mouse or the like.

At such steps S118 and S119, there are described the classification of the features, and the function of setting the weighting coefficient of the feature. In the setting of these conditions, combinations set in advance as the initial conditions are given. It is possible for users to retrieve the combinations in the initial conditions as they are, and it is also possible for users to arbitrarily make settings by using the processing at steps S118 and S119.

Next, at step S120, images are retrieved in accordance with the conditions set at the steps S118 and S119.

The feature quantity calculated at step S115 are given in M: f1 through fM. Suppose that the data in the database 105 for retrieval is N: I1 through IN. When the feature quantity matrix is represented in the mathematical expression (5), the feature quantity vector of the q-th three-dimensional image Iq is represented in the mathematical expression (6).

In the mathematical expression (6), each of the feature items is normalized by multiplying $k_j$ $$F = \begin{pmatrix} F_{11} & F_{12} & \cdots & F_{1p} & \cdots & F_{1M} \\ F_{21} & & & \vdots & & \\ \vdots & & & \vdots & & \\ F_{q1} & & & F_{qp} & & \\ \vdots & & & \vdots & & \\ F_{N1} & & & & & F_{NM} \end{pmatrix} \quad (5)$$

$$\vec{f}_q = \sum_{j=1}^{M} w_j \cdot \{D(k_j \cdot (F_{qj} - \overline{F}_j))\} \cdot \vec{i}_j \quad (6)$$

However, each item in the mathematical expression is a value defined in the following mathematical expression.

$$\overline{F}_p = \frac{1}{N}\sum_{j=1}^{N} F_{jp},\ v_p = \frac{1}{N}\sum_{j=1}^{N}(F_{jp} - \overline{F}_p)^2,$$

$$\sigma_p = \sqrt{v_p},\ kp = \frac{1}{\sigma_p},\ D_{(x)}\begin{cases} x|x| \leq d \\ d|x| > d \end{cases}$$

(For d, an appropriate value can be separately determined.) Symbol $w_j$ denotes a weighting coefficient of each feature.

The frequency can be defined from the feature vector of the mathematical expression (6).

That is, when the image to be retrieved is Ip, the similarity function with other image Iq in the database is represented in the following mathematical expression (7).

$$\mathrm{Sim}(p, q) = |\vec{f}_q^* - \vec{f}_q^*|^2 \quad (7)$$

the similarity is higher with an increase in the Sim (p, q).

In this manner, the order of similarity can be determined by calculating this function with respect to all the images in the database 105.

In the feature quantity defined in the mathematical expression (6), no consideration is included which is based on the classification of the features conducted in the processing at step S118. In the case where the features are classified, the definition mathematical expression can be provided which reflects the setting of the classification by changing the feature quantity with the weighting coefficient $W_j$, $W_{G(j)}$, and $W_j$ multiplied to each of the items.

However, $W_{G(j)}$ is a weighting coefficient of the group including the j-th feature $f_j$.

Next, at step S121, data is taken out in the quantity set in advance from the data having the greatest similarity on the basis of the similarity determined by retrieval at step S120. The data items are displayed on the display device 103 in the order of decreasing similarity.

Then, in the case where it is desired that data is retrieved from a different viewpoint after the retrieval execution and the retrieval result are displayed, the conditions of retrieval are set.

In the setting of these retrieval conditions, the edition of weighting coefficient with respect to each of the feature quantities become the major work, and the setting of the conditions is conducted in the same manner as the setting described at step S11 of FIG. 16.

FIG. 20 is a view showing a display example of the retrieval result.

In each of the windows, the region of interests of the retrieval object image and the retrieval result (the retrieval result 1 through the retrieval result 6 are displayed in an example of FIG. 20) are displayed on each of the smaller windows.

In each of these windows, a slice image is displayed in the case where the three-dimensional images to be treated is volume data.

As shown in FIG. 21, an image operation control portion is provided in each of the slice image display windows so that the slice image having the designated slice number can be read independently respectively with a slider and an instruction device.

Besides, the region of interest display can be transformed into the original image to be displayed with the instruction and operation input device 104.

Furthermore, in the designation by the instruction and operation input device 104, the window which is rendered in a three-dimensional manner is opened, so that there can be displayed in this window the three-dimensional rendering image by the polygon patch data prepared at the time of the setting of the region of interest and at the time of preparing the three-dimensional object or the volume rendering image based on the region of interest.

Furthermore, in the window, the arbitrary viewpoint of the object can be displayed, and conversion operation such as enlargement and shrinkage, and translation movement or the like can be operated by the operation of the instruction operation window for the change of the viewpoint.

A screen can be also constituted such that in same manner as the window for displaying the slice image, the window for the three-dimensional image display which is the same as FIG. 20 is prepared, and a window for the slice display and a window for the display of the retrieval result for the display of the three-dimensional image are displayed on the display device 103 at the same time.

Furthermore, in each of the windows, as shown in FIG. 21, the window can be displayed for not only the display of the image of the retrieval result but also the display of the quantitative information on similarity.

In this display window, the feature of the inspection object image, the feature of the retrieval result image, and a value of the difference thereof can be displayed with respect to each of the features f1 through fN.

Furthermore, in this display window, with respect to the value of the similarity evaluation function used for the calculation of the similarity shown in the mathematical expression (7), the value of the evaluation function and a difference value are respectively displayed with respect to the object image and the retrieval result image.

Then, the screen is constituted in such a manner that after the reading of the retrieval result, a menu or a button is arranged for changing the weighting coefficient under the request of the user so that after the retrieval the process can swiftly proceed to the inspection of the weighting coefficient.

Fifth Embodiment

Figure 22:
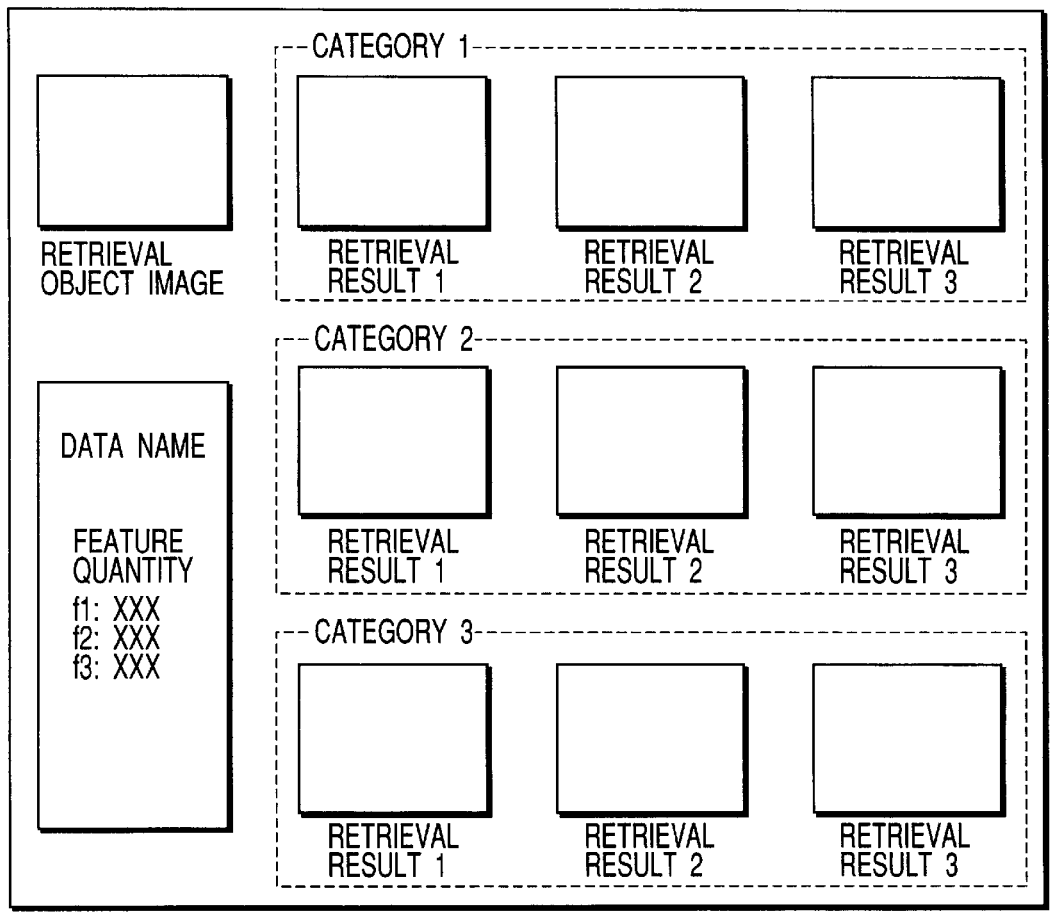
FIG. 22 is a view showing a display screen representing a fifth embodiment of the present invention.

FIG. 22 is a view showing a display screen showing a fifth embodiment of the present invention.

In this screen constitution, with respect to the object retrieval image, the retrieval condition is classified into the feature group with respect to the three-dimensional shape such as the position, the size and the roundness of the cube, so that the retrieval result is displayed noting the similarity for each of the groups.

Sixth Embodiment

Figure 23:
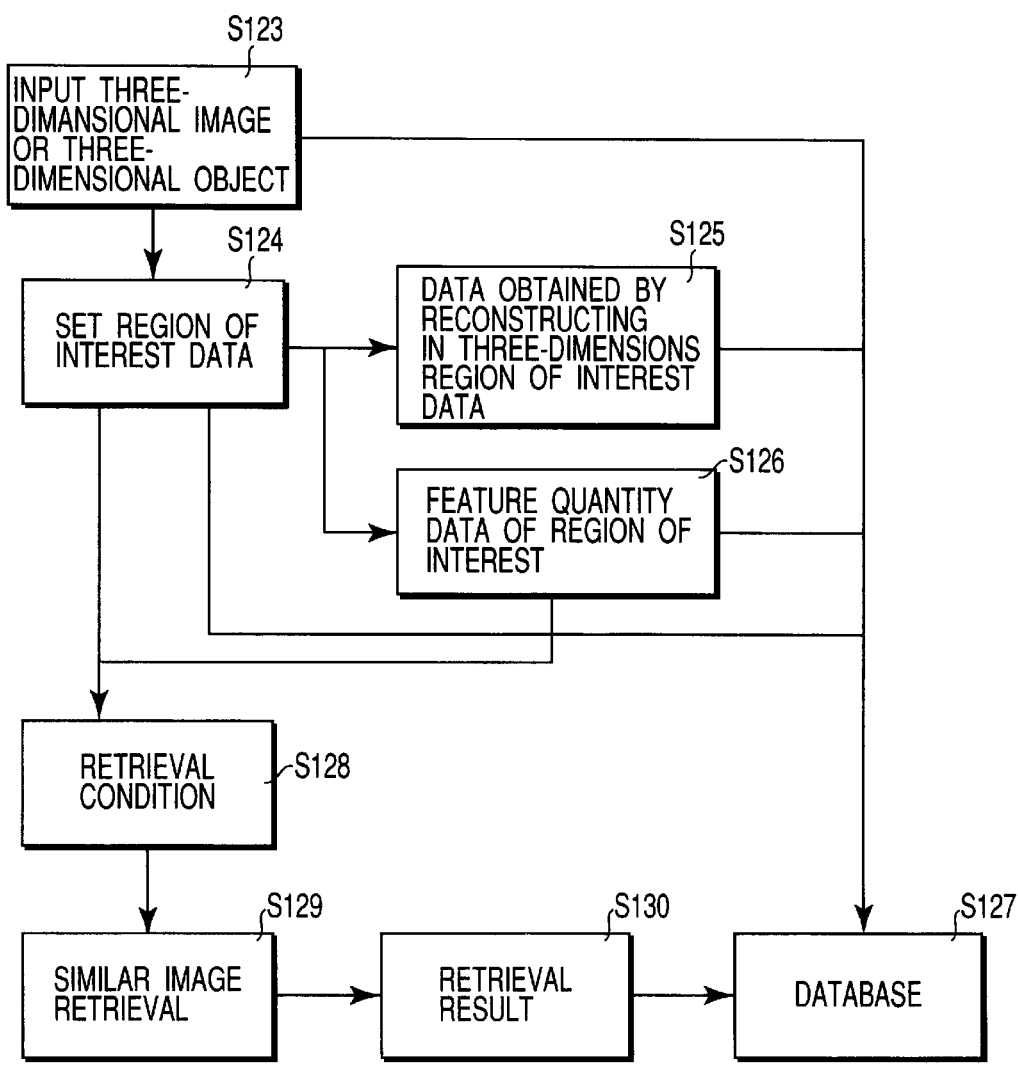
FIG. 23 is a flowchart for explaining a method for constructing a second database according to a sixth embodiment of the present invention.

FIG. 23 is a flowchart showing an explanation of a method for constructing a second database according to a sixth embodiment of the present invention.

In the sixth embodiment, in addition to the processing procedure of the method for constructing first database explained at steps S123 through S127, after the user sets the retrieval condition such as each kind of importance constant or the like for retrieving similar images at step S128, the user reviews the result of retrieval of similar images and accumulates the result of the retrieval of similar images in the database 105 at step S130.

At this time, as a method for association, there are available a method for associating the images obtained as a retrieval result to the retrieval condition as a retrieval, and a method for associating each image obtained as a retrieval result with the retrieval condition.

When the retrieval condition is set with respect to the reference image newly input by the user by using this associated retrieval condition, this retrieval condition is compared with the retrieval condition in the database 105. In the case where similar retrieval conditions are present, the similarity is calculated with respect to only the retrieval result retrieved with this retrieval condition, so that the shrinkage of the retrieval time can be realized.

Furthermore, there is provided a function of taking out retrieval conditions which are conducted before from the database 105, so that the associated retrieval result can be output without calculation from the conditions which are taken out.

Incidentally, in particular, according to claim 15, the following operation and advantage can be obtained.

With respect to the three-dimensional image or the object, the user interactively operates the region of interest for the retrieval of similarity on the screen, so that the user can set the region of interest which agrees with demand of the user by the designation of the region, the removal of noises and correction of the noises.

The data quantity for the display can be reduced because only the reconstructed region may be displayed at the time of the display of the retrieval result in order to generate data for the three-dimensional visualization by revising the region of interest designated by the user to reconstruct the region in a three-dimensional manner.

Furthermore, in the display, in order to display in a three-dimensional manner the retrieval result in the display device, the retrieval result can be displayed in an understandable manner from an arbitrary direction of the viewpoint in accordance with the operation by the user.

Furthermore, the calculated feature quantity is peculiar to the three-dimensional images. At the time of the retrieval of the three-dimensional images, the retrieval result can be obtained effectively in order to conduct retrieval in accordance with this peculiar feature.

The retrieval time can be shortened because only the feature quantity is accessed at the time of retrieval in order to accumulate in the database the data reconstructed in a three-dimensional manner and the calculated feature quantity data after associating the data reconstructed in the three-dimensional manner and the feature quantity data with the respectively input reference three-dimensional image or an object.

Furthermore, the image which is displayed first as a retrieval result provides a display of data which is reconstructed in a three-dimensional manner, but the input original image can be displayed in accordance with the instruction of the user, and various retrieval result can be displayed.

Incidentally, in particular, according to claim 16 described later, the following result and advantage can be obtained.

In the case where newly input data is retrieved under the set condition similar to the condition under which the data is previously retrieved by retrieving the input reference image or the object under the condition set by the user, associating the reference image or the object with the retrieval condition and the retrieval result, or associating the three-dimensional image or the object obtained as a result of retrieval with the retrieval condition and the retrieval result at respective time accumulating the image and the object in the database, the retrieval can be conducted efficiently by using the retrieval condition accumulated in the database, and by using the order of similarity of the retrieval result output at the retrieval output at the time of retrieval, and considering the order of similarity comparison with the newly input reference image with the result that the retrieval time can be shortened.

The inspection of the retrieval result can be easily inspected because only the retrieval result can be swiftly output without calculating the similarity comparison with respect to the result of retrieval previously conducted with respect to the selected retrieval condition by providing means which enables the user to select and take out retrieval condition accumulated in the database.

Consequently, as has been described, according to the fourth and the sixth embodiment, there is provided a three-dimensional database apparatus, a method for constructing three-dimensional image database which are capable of conducting an effective retrieval by using the feature peculiar to the three-dimensional image in order to retrieve the three-dimensional image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A similar image retrieving apparatus comprising:
 a region of Interest setting portion for setting a portion of a three-dimensional image of retrieved object including a landmark as a region of interest;
 a feature quantity calculation portion for calculating a feature quantity including positions of the landmark and of the region of interest set by the region of interest setting portion as parameters;
 a similarity calculation portion for calculating a similarity between the retrieved object and three-dimensional image data stored in the image database in advance by comparing the feature quantity of the region of interest of the retrieved object which quantity is calculated with the feature quantity calculation portion with the three-dimensional image data where a region of interest stored in the image database is set in advance and the feature quantity of this region of interest is calculated; and
 an image selection portion for selecting similar images in an order of decreasing similarity from the image database on the basis of the similarity calculated with the similarity calculation portion.

2. The similar image retrieving apparatus according to claim 1, wherein the similarity calculation portion calculates the similarity of the image with respect to only the image with which a key word agrees out of the key words selected from a set of key words prepared in advance and images to which key words are added in advance which images are stored in the image database.

3. The similar image retrieving apparatus according to claim 1, wherein the feature quantity calculation portion calculates the feature quantity by setting in advance the three-dimensional standard model which is compared in the image retrieval and using a position posture relationships between the standard model and the retrieved object image data.

4. An image retrieving apparatus comprising:
image database in which object three-dimensional images are stored; and
an image retrieving engine for retrieving images by using similarity of images;
the image retrieving engine comprising,
three-dimensional region of Interest setting means for cutting out the three-dimensional region of interest from the three-dimensional images where the object including a landmark input from the three-dimensional input device or from the image database is photographed,
feature quantity calculation means for calculating the feature quantity of the three-dimensional region of interest set, including the positions of the three-dimensional region of interest and the landmark as parameters,
similarity calculation and image selection means for calculating similarity between the three-dimensional region of interest and a constituent element of a three-dimensional image group stored in advance in the image database, a three-dimensional region of interest being set and the feature quantity being calculated by using the feature quantity thereof and selecting similar images from the image database in an order of decreasing similarity on the basis of the similarity, and
an image display means for retrieving the three-dimensional image selected with the similarity calculation and image selection means from the image database and displaying the image.

5. The image retrieving apparatus according to claim 4, wherein the image similarity calculation portion calculates the similarity only in the image with which the key word added to the image in advance agrees.

6. The apparatus for retrieving images according claim 4, wherein the feature quantity calculation portion calculates the feature quantity by using the position posture relationships with the standard object model.

7. A three-dimensional image database apparatus for retrieving an image similar to an input three-dimensional image, the apparatus comprising:
an image input portion for inputting three-dimensional image data;
a region of Interest setting portion for setting a region of interest on the basis of the designated condition with respect to the three-dimensional image data input with the image input portion;
a three-dimensional reconstruction portion for reconstructing three-dimensional image data by normalizing and visualizing this region of interest of the three-dimensional image data set with the region of Interest setting portion; and
a three-dimensional data accumulation portion for accumulating the three-dimensional image data of the region of interest normalized by the three-dimensional reconstruction portion in correspondence to the three-dimensional image data input in the image input portion.

8. The three-dimensional image database apparatus according to claim 7, wherein three-dimensional database apparatus has a features calculation portion for calculating feature quantity of the image data with respect to the region of interest of the three-dimensional image data set by the region of Interest setting means, and
the three-dimensional image data accumulation portion accumulates the feature quantity of the image data calculated with the feature quantity calculation portion in correspondence to the three-dimensional image data input with the image input portion.

9. A method for constructing image database for retrieving an image similar to the input three-dimensional image data, the method comprising the steps of:
inputting three-dimensional image data;
setting a region of interest on the basis of the designated condition with respect to the input three-dimensional image data;
reconstructing the three-dimensional image data by normalizing and visualizing the region of interest of the set three-dimensional data; and
accumulating the reconstructed three-dimensional image data of the normalized region of interest by allowing the image data to correspond to the input three-dimensional image data.

10. A method for constructing image database for retrieving an image similar to the input three-dimensional image, the method comprising:
inputting three-dimensional image data;
setting the region of interest on the basis of the designated condition with respect to the input three-dimensional image data;
reconstructing the three-dimensional image data by normalizing and visualizing the region of interest of the set three-dimensional data;
calculating the feature quantity of the normalized region of interest of the three-dimensional image; and
accumulating the three-dimensional image of the normalized region of interest and the feature quantity of the normalized region of interest by allowing the image and the feature quantity to correspond to the input three-dimensional image.

11. An image database apparatus for retrieving an image similar to the input three-dimensional image;
an image input portion for inputting the three-dimensional images;
a region of Interest setting portion for setting the region of interest for on the basis of the designation condition with respect to the three-dimensional images input with the image input portion;
a three-dimensional reconstruction portion for reconstructing the region of interest of the three-dimensional image by normalizing and visualizing the region of interest;
a three-dimensional image data accumulation portion for accumulating the three-dimensional image of a region of interest normalized by the three-dimensional reconstruction portion by allowing the image to correspond to the three-dimensional image input in the image input portion;
a retrieval condition input portion for inputting a condition for retrieving the three-dimensional image accumulated in the three-dimensional image data accumulation portion;

a similar image extraction portion for extracting similar images from the image accumulated in the three-dimensional data accumulation means on the basis of the retrieval condition input with the retrieval condition input portion; and a similar image accumulation portion for accumulating a similar image extracted by the similar image extraction portion by allowing the similar image to correspond to the three-dimensional image input with the image input portion and the retrieval condition input with the retrieval condition input portion.

12. The database apparatus according to claim 11, wherein the extracted similar images, the input three-dimensional images and the retrieval conditions are displayed in correspondence to each other.

13. A method for constructing image database for retrieving an image similar to the input three-dimensional images, the method comprising the steps of:

inputting a three-dimensional image;

setting a region of interest on the basis of the designation condition with respect to the input three-dimensional image;

reconstructing the region of interest of the input three-dimensional image by normalizing and visualizing the region of interest;

accumulating the reconstructed three-dimensional image of a normalized region of interest by allowing the image to correspond to the input three-dimensional image;

inputting a retrieval condition for retrieving accumulated three-dimensional images;

extracting a similar images from the accumulated three-dimensional image on the basis of the retrieval condition; and accumulating the extracted similar image by allowing the image to correspond to the input three-dimensional images and the retrieval condition.

14. The method for constructing images similar to the input three-dimensional images according to claim 13, further comprising the step of displaying the extracted similar images, the input three-dimensional images and the retrieval condition in correspondence to each other.

15. A similar image retrieving apparatus comprising:

region of Interest setting means for setting a part of the three-dimensional image of the retrieval object including a landmark as the region of interest;

feature quantity calculation portion for calculating the feature quantity of including portions of the landmark and the region of interest set with the region of interest setting means as parameters;

similarity calculation means for calculating similarity with the retrieval object and the three-dimensional data stored in advance in the image database by comparing the feature quantity of the region of interest of the retrieval object calculated with the feature quantity calculation means with the three-dimensional image data in which the region of interest is set which is stored in the image database in advance and the feature quantity of this region of interest is calculated;

image selection means for selecting similar images from the image database in the order of decreasing similarity on the basis of similarity calculated with the similarity calculation means.

16. The image retrieving means comprising:

image database in which the three-dimensional image of an object is stored;

an engine for retrieving images by using similarity of the images, the engine comprising:

three-dimensional region of Interest setting means for cutting out the three-dimensional region of interest from the three-dimensional images where the object including a landmark input from the three-dimensional input device or from the image database is photographed, feature quantity calculation means for calculating the feature quantity of the three-dimensional region of interest set with the three-dimensional region of Interest setting means, including the positions of the three-dimensional region of interest and the landmark as parameters, similarity calculation and image selection means for calculating similarity between the three-dimensional region of interest and a constituent element of a three-dimensional image group stored in advance in the image database, a three-dimensional region of interest being set and the feature quantity being calculated by using the feature quantity thereof and selecting similar images from the image database in an order of decreasing similarity on the basis of the similarity, and an image display means for retrieving the three-dimensional image selected with the similarity calculation and image selection means from the image database and displaying the image.

17. A three-dimensional image database apparatus for retrieving images similar to the input three-dimensional images, the apparatus comprising:

image input means for inputting three-dimensional image data;

region of Interest setting means for setting the region of interest on the basis of the designated condition with respect to the three-dimensional image data input with the image input means;

three-dimensional reconstruction means for reconstructing three-dimensional image data by normalizing and visualizing this region of interest of the three-dimensional image data set with the region of Interest setting means; and three-dimensional image data accumulating means for accumulating the three-dimensional image data of the region of interest normalized by the three-dimensional reconstruction means in correspondence to the three-dimensional image data input in the image input means.

18. An image database apparatus for retrieving images similar to the input images comprising:

image input means for inputting the three-dimensional images;

region of interest setting means for setting the region of interest on the basis of the designated condition with respect to the three-dimensional image input with the image input means;

three-dimensional reconstruction means for reconstructing the region of interest of three-dimensional image by normalizing and visualizing this region of interest of the three-dimensional image;

three-dimensional image data accumulating means for accumulating the three-dimensional image of a region of interest normalized by the three-dimensional reconstruction means by allowing the data correspond to the three-dimensional image data input in the image input means;

retrieval condition input means for inputting a condition for retrieval with respect to the three-dimensional image accumulated in the three-dimensional image data accumulation means;

similar image extraction means for extracting similar images from the images accumulated in the three-dimensional image accumulation means on the basis of the retrieval condition input with the retrieval condition input means; and similar image accumulation means for accumulating similar images extracted with the similar image extraction means in correspondence to the three-dimensional image input with the image input means and the retrieval condition input with the retrieval condition input means.

* * * * *